(12) United States Patent
Nijhof et al.

(10) Patent No.: US 9,479,257 B2
(45) Date of Patent: Oct. 25, 2016

(54) METHOD OF CONFIGURING AN OPTICAL COMMUNICATION NETWORK CONFIGURED FOR CO-PROPAGATING RAMAN AMPLIFICATION AND AN OPTICAL COMMUNICATION NETWORK ELEMENT

(71) Applicant: Telefonaktiebolaget L M Ericsson (publ), Stockholm (SE)

(72) Inventors: Jeroen Nijhof, Genoa (IT); Roberto Magri, Parma (IT)

(73) Assignee: TELEFONAKTIEBOLAGET L M ERICSSON (PUBL), Stockholm (SE)

( * ) Notice: Subject to any disclaimer, the term of this patent is extended or adjusted under 35 U.S.C. 154(b) by 0 days.

(21) Appl. No.: 14/652,954

(22) PCT Filed: Dec. 17, 2012

(86) PCT No.: PCT/EP2012/075738
§ 371 (c)(1),
(2) Date: Jun. 17, 2015

(87) PCT Pub. No.: WO2014/094814
PCT Pub. Date: Jun. 26, 2014

(65) Prior Publication Data
US 2015/0341117 A1    Nov. 26, 2015

(51) Int. Cl.
*H04B 10/00* (2013.01)
*H04B 10/291* (2013.01)
*H04B 10/293* (2013.01)

(52) U.S. Cl.
CPC ........ *H04B 10/2916* (2013.01); *H04B 10/293* (2013.01); *H04B 10/2912* (2013.01); *H04B 10/2931* (2013.01); *H04B 10/2933* (2013.01); *H04B 10/2939* (2013.01)

(58) Field of Classification Search
CPC ............ H04B 10/291; H04B 10/2912; H04B 10/2916; H04B 10/293; H04B 10/2933
USPC .............. 398/25, 37–38, 157, 158, 173, 180
See application file for complete search history.

(56) References Cited

U.S. PATENT DOCUMENTS

| | | | | |
|---|---|---|---|---|
| 6,657,777 | B1 * | 12/2003 | Meli | H04B 10/2916 359/334 |
| 2002/0063948 | A1 * | 5/2002 | Islam | H01S 3/302 359/334 |

(Continued)

OTHER PUBLICATIONS

Bindal et al: "Optimization of fiber Raman amplifier in a gain saturation regime", Optical Engineering, vol. 51, No. I, XP002709684, (Jan. 2012), pp. 015005-1-015005-6.*

(Continued)

*Primary Examiner* — Li Liu
(74) *Attorney, Agent, or Firm* — Nicholson De Vos Webster & Elliott, LLP

(57) ABSTRACT

A method includes: selecting an optical pump signal power of a Raman amplifier such that a saturated gain of the Raman amplifier is at a maximum operating level without exceeding a gain threshold above which an optical signal to noise ratio penalty is no longer negligible in the Raman amplifier; selecting an optical signal power for at least one optical communication signal to be transmitted across the optical link to maximise a Q-factor of the optical signal when the Raman amplifier is configured for said maximum operating level of the saturated gain; generating a pump signal power control signal to cause an optical pump signal source of the Raman amplifier to generate an optical pump signal having the selected optical pump signal power; and generating a signal power control signal configured to cause the optical communication signal to be delivered into the optical link at the selected optical signal power.

18 Claims, 11 Drawing Sheets

(56) References Cited

U.S. PATENT DOCUMENTS

| | | | | |
|---|---|---|---|---|
| 2003/0151799 A1* | 8/2003 | Wight | .................. | H01S 3/2383 359/334 |
| 2005/0147370 A1* | 7/2005 | Yusoff | .................... | G02F 1/365 385/125 |
| 2005/0157378 A1* | 7/2005 | Griseri | .............. | H04B 10/2916 359/334 |
| 2006/0109543 A1* | 5/2006 | Bragheri | ............ | H01S 3/06758 359/334 |

OTHER PUBLICATIONS

Chang, et al., "Simple numerical characterization of double Rayleigh scattering noise in fiber Raman amplifiers", OFC 2002, Postconference Technical Digest, Postdeadline Papers, Opt Soc. America, Washington, DC, USA; IEEE, vol. 70, XP010618042, Mar. 17, 2002, pp. 651-653.*

Faralli, et al., "Unrepeated WDM Transmission Systems Based on Advanced First-Order and Higher Order Raman-Copumping Technologies", Journal of Lightwave Technology, IEEE Service Center, New York, NY, US, vol. 25, No. 11, XP011194807, (Nov. 1, 2007), pp. 3519-3527.*

PCT International Search Report for Counterpart PCT Application No. PCT/EP2012/075738, (Aug. 21, 2013), 3 pages.

PCT Written Opinion of the International Searching Authority for Counterpart PCT Application No. PCT/EP2012/075738, (Aug. 21, 2013), 7 pages.

Bolognini G et al: "Bidirectional Higher Order Cascaded Raman Amplification Benefits for 10-Gb/s WDM Unrepeated Transmission Systems", Journal of Lightwave Technology, IEEE Service Center, New York, NY, US, vol. 23, No. 8, XP011138116, (Aug. 1, 2005), pp. 2427-2433.

Bristiel, et al., "New model of noise figures and RIN transfer in fiber Raman amplifiers," Photonics Technology Letters, vol. 18, No. 8, (Apr. 15, 2006), pp. 980-982).

Chang, et al., "Simple numerical characterization of double Rayleigh scattering noise in fiber raman amplifiers", Optical Fiber Communications Conference, (OFC). Postconference Technical Digest, Postdeadline Papers (IEEE Cat. N0.02CH37339) Opt Soc. America Washington, DC, USA; [Trends in Optics and Photonics Series. (TOPS)]. IEEE, vol. TOPS. vol. 70, XP010618042, (Mar. 17, 2002), pp. 651-653.

Kim, et al., "Semi-Analytic Gain Control Algorithm for the Fiber Raman Amplifier under Dynamic Channel Reconfiguration," OTuN5, Optical Society of America, (Mar. 6-11, 2005), 3 pages.

Park, et al., "Nonlinear Phase Shift Scanning Method for Optimal Design of Raman Transmission Systems," Journal of Lightwave Technology, vol. 24, No. 3, XP002709683, (Mar. 2006), pp. 1257-1268.

* cited by examiner

20 ⟶

```
┌─────────────────────────────────────────────┐
│ select an optical pump signal power, P_p, of the Raman │
│ amplifier such that a saturated gain, G, of the Raman │
│ amplifier is maximised without exceeding a gain │  — 12
│ threshold above which an OSNR penalty due to double │
│ Rayleigh scattering is no longer negligible in the Raman │
│ amplifier │
└─────────────────────────────────────────────┘
                      ↓
┌─────────────────────────────────────────────┐
│ obtain an optimal optical signal power, P_nl, for the │
│ optical communication signal at which the Q-factor of │  — 22
│ the optical communication signal is maximised in the │
│ absence of Raman amplification │
└─────────────────────────────────────────────┘
                      ↓
┌─────────────────────────────────────────────┐
│ calculate a nonlinear enhancement factor, NEF, being an │
│ optical signal power reduction required to the optimal │
│ optical signal power for said maximised saturated gain │  — 24
│ to avoid an increase in a nonlinear degradation of the │
│ optical signal when Raman amplification is applied to │
│ the optical communication signal │
└─────────────────────────────────────────────┘
                      ↓
┌─────────────────────────────────────────────┐
│ calculate an optimal value for the optical signal power, │
│ P_ch, as │  — 26
│                                             │
│         $P_{ch} = P_{nl} - NEF$             │
└─────────────────────────────────────────────┘
                      ↓
┌─────────────────────────────────────────────┐
│ generate a pump signal power control signal configured │
│ to cause an optical pump signal source of the Raman │  — 16
│ amplifier to generate an optical pump signal having the │
│ selected optical pump signal power │
└─────────────────────────────────────────────┘
                      ↓
┌─────────────────────────────────────────────┐
│ generate a signal power control signal configured to │  — 18
│ cause the optical communication signal to be delivered │
│ into the optical link at the selected optical signal power │
└─────────────────────────────────────────────┘
```

Fig. 2

METHOD OF CONFIGURING AN OPTICAL COMMUNICATION NETWORK CONFIGURED FOR CO-PROPAGATING RAMAN AMPLIFICATION AND AN OPTICAL COMMUNICATION NETWORK ELEMENT

CROSS-REFERENCE TO RELATED APPLICATIONS

This application is a National stage of International Application No. PCT/EP2012/075738, filed Dec. 12, 2012, which are hereby incorporated by reference.

TECHNICAL FIELD

The invention relates to a method of configuring an optical communication network comprising an optical link comprising a Raman amplifier configured for co-propagating Raman amplification. The invention further relates to an optical communication network element and to an optical communication network.

BACKGROUND

Long spans in optical communication networks (e.g. submarine links) require Raman amplification due to its better noise characteristics. The most demanding connections, such as those to distant islands, long festoons, and but skipping spans, require, in addition to the usual counter-propagating Raman pumping scheme, the use of the co-propagating (also referred to a forward pumping) Raman scheme. Higher order Raman pumping schemes can also be used for further performance enhancement.

The co-propagating Raman amplification scheme is the most critical since the signal power is at its highest level in the optical link and gets amplified by the Raman pump, so nonlinear effects can degrade performance if an inappropriate channel signal power is set. The co-propagating Raman amplification scheme is also affected by the 'gain saturation' phenomenon where the gain of the Raman amplifier can be reduced due to pump depletion induced by high signal power amplification; the higher the signal power, the higher the gain reduction due to pump depletion. As a result, finding the optimal channel signal power to launch an optical signal at in an optical communication network configured for co-propagating Raman amplification is a difficult task and usually needs to be done by expert personnel in the field, with many try and see steps. In addition, when the channel count changes, for example due to network upgrades, the channel launch power needs to be re-optimized because gain saturation couples the gain of the Raman amplifier with the channel count.

Existing Raman amplification networks are operated to keep the gain of the Raman amplifier constant by adjusting the Raman pump power when the channel count changes. An example of this approach is reported in P. Kim and N. Park "Semi-Analytic gain control algorithm for the fiber Raman amplifier under dynamic channel reconfiguration", Optical Fiber Communication Conference, 6-11 Mar. 2005, OTuN5.

SUMMARY

It is an object to provide an improved method of configuring an optical communication network comprising an optical link comprising a Raman amplifier configured for co-propagating Raman amplification. It is a further object to provide an improved optical communication network element. It is a further object to provide an improved optical communication network.

A first aspect of the invention provides a method of configuring an optical communication network. The optical communication network comprises an optical link comprising an optical fibre configured as a Raman amplifier configured for co-propagating Raman amplification. The method comprises step a. of selecting an optical pump signal power, $P_p$, of the Raman amplifier such that a saturated gain, G, of the Raman amplifier is at a maximum operating level without exceeding a gain threshold, $G_{max}$, above which an optical signal to noise ratio penalty caused by double Rayleigh scattering is no longer negligible in the Raman amplifier. The method comprises step b. of selecting an optical signal power, $P_{ch}$, for at least one optical communication signal to be transmitted across the optical link. The optical signal power is selected to maximise a Q-factor of the optical signal when the Raman amplifier is configured for said maximum operating level of the saturated gain. The method comprises step c. of generating a pump signal power control signal configured to cause an optical pump signal source of the Raman amplifier to generate an optical pump signal having the selected optical pump signal power. The method comprises step d. of generating a signal power control signal configured to cause the optical communication signal to be delivered into the optical link at the selected optical signal power.

The method may enable the optical communication signal power to be optimized in an optical communication network where co-propagating Raman amplification is used. This may result in an improvement in the Raman link budget, enabling longer links to be used. The method may enable an optimal combination of Raman gain and optical communication signal power to be selected while avoiding increased nonlinear impairment due to distributed Raman amplification. The method may enable the optical signal power to be optimised accounting for both pump depletion and nonlinear impairments. The method may enable use of the available optical pump signal power to be maximised.

In an embodiment, step a. comprises selecting an optical pump signal power, $P_p$, of the Raman amplifier such that a saturated gain, G, of the Raman amplifier is at a maximum operating level without exceeding a gain threshold above which an optical signal to noise ratio penalty caused by double Rayleigh scattering and relative intensity noise transfer is no longer negligible in the Raman amplifier. The method may enable the optical communication signal power to be optimised without incurring significant levels of double Rayleigh scattering and relative intensity noise, RIN, transfer.

In an embodiment, in step a. the gain threshold is a saturated gain above which the optical signal to noise ratio penalty caused by double Rayleigh scattering and relative intensity noise transfer is less than 0.5 dB.

In an embodiment, in step a. the gain threshold is a saturated gain above which the optical signal to noise ratio penalty caused by double Rayleigh scattering and relative intensity noise transfer is less than 0.1 dB.

In an embodiment, the gain threshold is a pre-selected value which is set by a manufacturer of an optical pump signal source configured to generate the optical pump signal.

In an embodiment, the gain threshold is a pre-selected value which is determined by characterisation measurements of an optical pump signal source configured to generate the optical pump signal.

In an embodiment, the gain threshold is determined in dependence on a relative intensity noise, RIN, specification of an optical pump source of the Raman amplifier. The gain threshold may be determined using equations 7 and 14 disclosed in B. Bristiel et al "New model of noise figure and RIN transfer in fiber Raman amplifiers", Photonics Technology Letters, vol. 18, no. 8, 15 Apr. 2006, pages 980-982. The method may therefore be used both in an optical communication network having a Raman pump signal configured for negligible RIN transfer and one in which poorer quality optical pump signals having high RIN are used.

In an embodiment, the gain threshold is a maximum acceptable nonlinear impairment constrained gain. In an embodiment, the gain threshold is in the range 26 dB to 28 dB.

In an embodiment, step b. comprises step i. of obtaining an optimal optical signal power, $P_{nl}$, for the optical communication signal at which the Q-factor of the optical communication signal is maximised in the absence of Raman amplification. Step b. comprises step ii. of calculating a nonlinear enhancement factor, NEF. The nonlinear enhancement factor is an optical signal power reduction required to the optimal optical signal power for said maximised saturated gain to avoid an increase in a nonlinear degradation of the optical signal when Raman amplification is applied to the optical communication signal. Step b. comprises step iii. of calculating an optimal value for the optical signal power, $P_{ch}$, as $P_{ch}=P_{nl}-NEF$. The method may enable an optimal value to be selected for the optical signal power which avoids an increase in nonlinear impairments due to distributed Raman amplification.

In an embodiment, step b. is repeated until the optical signal power converges to a stable value. This may enable the optical signal power to be selected automatically, thereby simplifying commissioning of optical communication network links having Raman amplification and reducing the need to send an expert engineer into the field to commission a link.

In an embodiment, step a. comprises checking whether $G>G_{max}+\Delta$, where $\Delta$ is a hysteresis parameter. $\Delta$ is greater than a network tolerance of the communication network. Including the hysteresis parameter may enable a stable value of the optical signal power to be selected. The hysteresis parameter is larger than the network tolerance to avoid oscillations in the optical signal power but is small enough so that G is not selected to have a value which would degrade the performance, i.e. reduce the Q-factor, of the communication network.

In an embodiment, step a. further comprises checking whether $G<G_{max}-\Delta$ and $P_p$ is less than a maximum available optical pump signal power.

In an embodiment, step a. comprises initially selecting a minimum value for the optical signal power and selecting a maximum operating signal power of an optical pump source of the Raman amplifier as an initial value for the optical pump signal power. This may enable the optical signal power to be ramped up automatically from a minimum value to its optimal value.

In an embodiment, the optimal optical signal power in the absence of Raman amplification, $P_{nl}$, is obtained by determining a number of optical communication signals, $N_{ch}$, to be transmitted across the optical link and retrieving a pre-stored value of $P_{nl}$ in dependence on at least one of a currently set optical signal power, Pch, and the number of optical communication signals, a characteristic of the optical fibre and a modulation format of the optical communication signals. The pre-stored value of $P_{nl}$ may therefore be retrieved according to one or more of the type of optical fibre forming the Raman amplifier, the number of optical communication signals and the modulation format of the signals.

In an embodiment, step a. comprises selecting an initial value for the optical signal power. Step b. further comprises obtaining a value for the saturated gain, G, of the Raman amplifier at the selected optical pump signal power and the selected optical signal power. Step b. comprises calculating a nonlinear enhancement factor, NEF, for the selected optical signal power, and calculating an optimal optical signal power in the absence of Raman amplification, $P_{nl}$, as $P_{nl}=P_{ch}+NEF$. This may enable the method to start with a manual setting of the optical signal power, by an engineer in the field, with the method then being used to optimise the optical signal power value.

In an embodiment, the saturated gain is obtained by measurement. The nonlinear enhancement factor is calculated as NEF=M*G, where M is a scaling factor in the range 0.7-0.8.

In an embodiment, steps a. and b. are repeated until a stable value for the optical signal power is obtained. The method may therefore start with a measured value of the saturated gain and iterate until the optimal optical signal power is arrived at.

In an embodiment, M is approximately 0.8.

In an embodiment, M is determined by calibration of the Raman amplifier either by measurement or by simulation modelling. M may thereby be determined for a specific pumping scheme of the Raman amplifier.

In an embodiment, the saturated gain, G(z), is calculated as $$G(z) = \frac{G_0(z)(P_p + S)}{P_p + G_0(z)S},$$

where z is a distance along the optical link, S is the normalised total optical signal power, $P_p$ is the normalised optical pump signal power, and $G_0(z)$ is the unsaturated gain of the Raman amplifier.

In an embodiment, the unsaturated gain is given by $G_0(z)=\exp((P_p+S)(1e^{-\alpha z}))$, where $\alpha$ is the loss coefficient of the optical link at a wavelength of the optical communication signal. The nonlinear enhancement factor is calculated as the ratio of the effective lengths of the Raman amplifier with and without Raman amplification. The normalised optical pump power is given by $$P_p = \frac{f_s g_R P_p(0)}{f_p \alpha_p A_{eff}}$$

where $f_s$ is the optical communication signal frequency, $f_p$ is the optical pump signal frequency, $g_R$ is the Raman gain of the fibre, $P_p(0)$ is the normalised optical pump signal power at z=0, $\alpha_p$ is the loss coefficient of an optical fibre of the optical link at the pump signal frequency, and $A_{eff}$ is the effective area of the fibre. The normalised total optical signal power is given by $$S = \frac{g_R P_s(0)}{\alpha_s A_{eff}}$$

where $P_s(0)$ is the optical signal power at z=0, and $\alpha_s$ is the loss coefficient of the fibre at the optical communication signal frequency.

In an embodiment, the nonlinear enhancement factor is calculated as $$NEF = \frac{1}{S}\ln\left(\frac{G_0(z)}{G(z)}\right).$$

In an embodiment, in step b. the optical signal power is for a plurality of optical communication signals. The method may be used for a wavelength division multiplexed optical communication network.

In an embodiment, steps a. to d. are implemented during an initial configuration of the optical communication network.

In an embodiment, steps a. to d. are implemented following a change in the number of optical communication signals. The method may therefore be run whenever the number of optical communication signals changes, to re-optimise the optical signal power.

A second aspect of the invention provides an optical communication network element comprising an optical pump signal source, optical communication signal power control apparatus, an output and a controller. The output is configured to output at least one optical communication signal and a co-propagating optical pump signal to be delivered to an optical link comprising an optical fibre configured as a Raman amplifier. The controller is configured to:
 a. select an optical pump signal power, $P_p$, such that a saturated gain, G, of the Raman amplifier is at a maximum operating level without exceeding a gain threshold above which an optical signal to noise ratio penalty caused by double Rayleigh scattering is no longer negligible in the Raman amplifier;
 b. select an optical signal power, $P_{ch}$, for the at least one optical communication signal, the optical signal power being selected to maximise a Q-factor of the optical signal when the Raman amplifier is configured for said maximum operating level of the saturated gain;
 c. generate a pump power control signal configured to cause the optical pump signal source of the Raman amplifier to generate an optical pump signal having the selected optical pump signal power; and
 d. generate a signal power control signal configured to cause the optical communication signal power control apparatus to set the optical signal power of the at least one optical communication signal to the selected optical signal power.

The optical communication network element may enable the optical communication signal power to be optimized for launch into an optical communication network where co-propagating Raman amplification is used. This may result in an improvement in the Raman link budget, enabling longer links to be used. The optical communication network element may enable an optimal combination of optical pump signal power, and thus Raman gain in the optical communication network, and optical communication signal power to be selected while avoiding increased nonlinear impairment in the optical communication network due to distributed Raman amplification. The optical communication network element may enable the optical signal power to be optimised accounting for both pump depletion and nonlinear impairments in the optical communication network. The optical communication network element may enable use of the optical pump signal power available from the optical pump signal source to be maximised. In an embodiment, the controller is configured in step a. to select an optical pump signal power, $P_p$, of the Raman amplifier such that a saturated gain, G, of the Raman amplifier is at a maximum operating level without exceeding a gain threshold above which an optical signal to noise ratio penalty caused by double Rayleigh scattering and relative intensity noise transfer is no longer negligible in the Raman amplifier. This may enable the optical communication signal power to be optimised without incurring significant levels of double Rayleigh scattering and relative intensity noise, RIN, transfer in the optical communication network with which it is to be used.

In an embodiment, in step a. the gain threshold is a saturated gain above which the optical signal to noise ratio penalty caused by double Rayleigh scattering and relative intensity noise transfer is less than 0.5 dB.

In an embodiment, in step a. the gain threshold is a saturated gain above which the optical signal to noise ratio penalty caused by double Rayleigh scattering and relative intensity noise transfer is less than 0.1 dB.

In an embodiment, the gain threshold is a pre-selected value which is set by a manufacturer of the optical pump signal source.

In an embodiment, the gain threshold is a pre-selected value which is determined by characterisation measurements of the optical pump signal source.

In an embodiment, the gain threshold is a maximum acceptable nonlinear impairment constrained gain. In an embodiment, the gain threshold is in the range 26 dB to 28 dB.

In an embodiment, the controller is configured to, in step b.:
 i. obtain an optimal optical signal power, $P_{nl}$, for the optical communication signal at which the Q-factor of the optical communication signal is maximised in the absence of Raman amplification;
 ii. calculate a nonlinear enhancement factor, NEF, being an optical signal power reduction required to the optimal optical signal power for said maximised saturated gain to avoid an increase in a nonlinear degradation of the optical signal when Raman amplification is applied to the optical communication signal; and
 iii. calculate an optimal value for the optical signal power, $P_{ch}$, as $$P_{ch} = P_{nl} - NEF$$

This may enable an optimal value to be selected for the optical signal power which avoids an increase in nonlinear impairments due to distributed Raman amplification in the optical communication network into which the communication network element delivers the optical communication signal and the optical pump signal.

In an embodiment, the controller is configured to repeat step b. until the optical signal power converges to a stable value. This may enable the optical signal power to be selected automatically, thereby simplifying commissioning of optical communication network links having Raman amplification and reducing the need to send an expert engineer into the field to commission a link.

In an embodiment, the controller is configured in step a. to check whether $G > G_{max} + \Delta$, where $\Delta$ is a hysteresis parameter. $\Delta$ is greater than a network tolerance of the communication network. Including the hysteresis parameter may enable a stable value of the optical signal power to be selected. The hysteresis parameter is larger than the network tolerance to avoid oscillations in the optical signal power but is small enough so that G is not selected to have a value which would degrade the performance, i.e. reduce the Q-factor, of the communication network.

In an embodiment, the controller is further configured in step a. to check whether $G < G_{max} - \Delta$ and to check whether $P_p$ is less than a maximum available optical pump signal power.

In an embodiment, the controller is configured in step a. to initially select a minimum value for the optical signal power and selecting a maximum operating signal power of an optical pump source of the Raman amplifier as an initial value for the optical pump signal power. This may enable the optical signal power to be ramped up automatically from a minimum value to its optimal value.

In an embodiment, the controller is configured in step b.i. to determine a number of optical communication signals, $N_{ch}$, to be delivered to the optical link. The controller is configured in step b.i. to obtain the optimal optical signal power, $P_{nl}$, by retrieving a pre-stored value of $P_{nl}$ in dependence on at least one of a currently set optical signal power, Pch, and the number of optical communication signals, a characteristic of the optical fibre and a modulation format of the optical communication signals. The pre-stored value of $P_{nl}$ may therefore be retrieved by the controller according to one or more of the type of optical fibre forming the Raman amplifier, the number of optical communication signals and the modulation format of the signals.

In an embodiment, the controller is configured in step b. to obtain a value for the saturated gain, G, of the Raman amplifier at the selected optical pump signal power and the selected optical signal power. The controller is configured in step b. to calculate a nonlinear enhancement factor, NEF, for the selected optical signal power and to calculate an optimal optical signal power in the absence of Raman amplification, $P_{nl}$, as $P_{nl} = P_{ch} + NEF$. This may enable the communication network element to receive an initial manually set optical signal power, set by an engineer in the field, and then to operate to optimise the optical signal power value.

In an embodiment, the communication network element comprises gain measurement apparatus configured to measure the saturated gain of the Raman amplifier. The controller is configured to receive the measured saturated gain and to calculate the nonlinear enhancement factor as $NEF = M*G$, where M is a scaling factor in the range 0.7-0.8.

In an embodiment, the controller is configured to repeat steps a. and b. until a stable value for the optical signal power is obtained. The network element may therefore start with a measured value of the saturated gain and the controller operate iteratively until the optimal optical signal power is arrived at.

In an embodiment, M is approximately 0.8.

In an embodiment, the controller is configured to calculate saturated gain, G(z), as $$G(z) = \frac{G_0(z)(P_p + S)}{P_p + G_0(z)S},$$

where z is a distance along the optical link, S is the normalised total optical signal power, $P_p$ is the normalised optical pump signal power, and $G_0(z)$ is the unsaturated gain of the Raman amplifier.

In an embodiment, the unsaturated gain of the Raman amplifier is given by $G_0(z) = \exp((P_p + S)(1 - e^{-\alpha z}))$, where $\alpha$ is the loss coefficient of the optical link at a wavelength of the optical communication signal. The controller is configured to calculate the nonlinear enhancement factor as the ratio of the effective lengths of the Raman amplifier with and without Raman amplification. The normalised optical pump signal power is given by $$P_p = \frac{f_s g_R P_p(0)}{f_p \alpha_p A_{eff}}$$

where $f_s$ is the optical communication signal frequency, $f_p$ is the optical pump signal frequency, $g_R$ is the Raman gain of the fibre, $P_p(0)$ is the normalised optical pump power at z=0, $\alpha_p$ is the loss coefficient of the fibre at the pump signal frequency, and $A_{eff}$ is the effective area of the fibre. The normalised total optical signal power is given by $$S = \frac{g_R P_s(0)}{\alpha_s A_{eff}}$$

where $P_s(0)$ is the optical signal power at z=0, and $\alpha_s$ is the loss coefficient of the fibre at the optical communication signal frequency.

In an embodiment, the controller is configured to calculate the nonlinear enhancement factor as $$NEF = \frac{1}{S} \ln\left(\frac{G_0(z)}{G(z)}\right).$$

In an embodiment, the controller is configured in step b. to select the optical signal power for a plurality of optical communication signals. The communication network element may be used in a wavelength division multiplexed optical communication network.

In an embodiment, the controller is configured to implement steps a. to d. during an initial configuration of the optical communication network.

In an embodiment, the controller is configured to implement steps a. to d. in response to a change in the number of optical communication signals. The controller may therefore re-optimise the optical signal power whenever the number of optical communication signals changes.

In an embodiment, the optical pump signal source comprises a plurality of optical pump signal sub-sources each configured to generate an optical pump sub-signal and an optical signal combiner configured to combine the optical pump sub-signals to form the optical pump signal.

In an embodiment, the optical pump signal source is configured to generate an optical pump signal for single stage Raman pumping.

In an embodiment, the optical pump signal source is configured to generate an optical pump signal for cascaded Raman pumping.

In an embodiment, the optical communication signal power control apparatus comprises one of an optical transmitter and an optical amplifier.

A third aspect of the invention provides an optical communication network comprising an optical link and an optical communication network element. The optical link comprises an optical fibre configured as a Raman amplifier configured for co-propagating Raman amplification. The optical communication network element comprises an optical pump signal source, optical communication signal power control apparatus, an output and a controller. The output is configured to output at least one optical communication signal and a co-propagating optical pump signal to be delivered to the optical link. The controller is configured to:
  a. select an optical pump signal power, $P_p$, such that a saturated gain, G, of the Raman amplifier is at a maximum operating level without exceeding a gain threshold above which an optical signal to noise ratio penalty caused by double Rayleigh scattering is no longer negligible in the Raman amplifier;
  b. select an optical signal power, $P_{ch}$, for the at least one optical communication signal, the optical signal power being selected to maximise a Q-factor of the optical signal when the Raman amplifier is configured for said maximum operating level of the saturated gain;
  c. generate a pump power control signal configured to cause the optical pump signal source of the Raman amplifier to generate an optical pump signal having the selected optical pump signal power; and
  d. generate a signal power control signal configured to cause the optical communication signal power control apparatus to set the optical signal power of the at least one optical communication signal to the selected optical signal power.

The optical communication network may be configured for optimal optical communication signal power in the presence of co-propagating Raman amplification. This may result in an improvement in the Raman link budget, enabling longer links to be used in the network. An optimal combination of optical pump signal power, and thus Raman gain in the optical communication network, and optical communication signal power may be selected for the network while avoiding increased nonlinear impairment due to distributed Raman amplification. The optical communication network may be configured for optimal optical communication signal power accounting for both pump depletion and nonlinear impairments. Use of the optical pump signal power available from the optical pump signal source may be maximised in the network.

In an embodiment, the controller is configured in step a. to select an optical pump signal power, $P_p$, of the Raman amplifier such that a saturated gain, G, of the Raman amplifier is at a maximum operating level without exceeding a gain threshold above which an optical signal to noise ratio penalty caused by double Rayleigh scattering and relative intensity noise transfer is no longer negligible in the Raman amplifier. This may enable the optical communication signal power to be optimised without incurring significant levels of double Rayleigh scattering and relative intensity noise, RIN, transfer in the optical communication network.

In an embodiment, in step a. the gain threshold is a saturated gain above which the optical signal to noise ratio penalty caused by double Rayleigh scattering and relative intensity noise transfer is less than 0.5 dB.

In an embodiment, in step a. the gain threshold is a saturated gain above which the optical signal to noise ratio penalty caused by double Rayleigh scattering and relative intensity noise transfer is less than 0.1 dB.

In an embodiment, the gain threshold is a pre-selected value which is set by a manufacturer of the optical pump signal source.

In an embodiment, the gain threshold is a pre-selected value which is determined by characterisation measurements of the optical pump signal source.

In an embodiment, the gain threshold is a maximum acceptable nonlinear impairment constrained gain. In an embodiment, the gain threshold is in the range 26 dB to 28 dB.

In an embodiment, the controller is configured to, in step b.:
  i. obtain an optimal optical signal power, $P_{nl}$, for the optical communication signal at which the Q-factor of the optical communication signal is maximised in the absence of Raman amplification;
  ii. calculate a nonlinear enhancement factor, NEF, being an optical signal power reduction required to the optimal optical signal power for said maximised saturated gain to avoid an increase in a nonlinear degradation of the optical signal when Raman amplification is applied to the optical communication signal; and
  iii. calculate an optimal value for the optical signal power, $P_{ch}$, as $P_{ch}=P_{nl}-NEF$ This may enable an optimal value to be selected for the optical signal power which avoids an increase in nonlinear impairments due to distributed Raman amplification in the optical communication network.

In an embodiment, the controller is configured to repeat step b. until the optical signal power converges to a stable value. This may enable the optical signal power to be selected automatically, thereby simplifying commissioning of links in the optical communication network having Raman amplification and reducing the need to send an expert engineer into the field to commission a link.

In an embodiment, the controller is configured in step a. to check whether $G>G_{max}+\Delta$, where $\Delta$ is a hysteresis parameter. $\Delta$ is greater than a network tolerance of the communication network. Including the hysteresis parameter may enable a stable value of the optical signal power to be selected. The hysteresis parameter is larger than the network tolerance to avoid oscillations in the optical signal power but is small enough so that G is not selected to have a value which would degrade the performance, i.e. reduce the Q-factor, of the communication network.

In an embodiment, the controller is further configured in step a. to check whether $G<G_{max}-\Delta$ and to check whether $P_p$ is less than a maximum available optical pump signal power.

In an embodiment, the controller is configured in step a. to initially select a minimum value for the optical signal power and selecting a maximum operating signal power of an optical pump source of the Raman amplifier as an initial value for the optical pump signal power. This may enable the optical signal power to be ramped up automatically from a minimum value to its optimal value.

In an embodiment, the controller is configured in step b.i. to determine a number of optical communication signals, $N_{ch}$, to be delivered to the optical link. The controller is configured in step b.i. to obtain the optimal optical signal power, $P_{nl}$, by retrieving a pre-stored value of $P_{nl}$ in dependence on at least one of a currently set optical signal power, Pch, and the number of optical communication signals, a characteristic of the optical fibre and a modulation format of the optical communication signals. The pre-stored value of $P_{nl}$ may therefore be retrieved by the controller according to one or more of the type of optical fibre forming the Raman amplifier, the number of optical communication signals and the modulation format of the signals.

In an embodiment, the controller is configured in step b. to obtain a value for the saturated gain, G, of the Raman amplifier at the selected optical pump signal power and the selected optical signal power. The controller is configured in step b. to calculate a nonlinear enhancement factor, NEF, for the selected optical signal power and to calculate an optimal optical signal power in the absence of Raman amplification, $P_{nl}$, as $P_{nl}=P_{ch}+NEF$. This may enable the communication network element to receive an initial manually set optical signal power, set by an engineer in the field, and then to operate to optimise the optical signal power value for the network.

In an embodiment, the communication network element comprises gain measurement apparatus configured to measure the saturated gain of the Raman amplifier. The controller is configured to receive the measured saturated gain and to calculate the nonlinear enhancement factor as $NEF=M*G$, where M is a scaling factor in the range 0.7-0.8.

In an embodiment, the controller is configured to repeat steps a. and b. until a stable value for the optical signal power is obtained. The network element may therefore start with a measured value of the saturated gain and the controller operate iteratively until the optimal optical signal power is arrived at.

In an embodiment, M is approximately 0.8.

In an embodiment, the controller is configured to calculate saturated gain, $G(z)$, as $$G(z) = \frac{G_0(z)(P_p + S)}{P_p + G_0(z)S},$$

where z is a distance along the optical link, S is the normalised total optical signal power and $G_0(z)$ is the unsaturated gain of the Raman amplifier.

In an embodiment, the unsaturated gain of the Raman amplifier is given by $G_0(z)=\exp((P_p+S)(1e^{-\alpha z}))$, where α is the loss coefficient of the optical link at a wavelength of the optical communication signal. The controller is configured to calculate the nonlinear enhancement factor as the ratio of the effective lengths of the Raman amplifier with and without Raman amplification.

The normalised optical pump signal power is given by $$P_p = \frac{f_s g_R P_p(0)}{f_p \alpha_p A_{eff}}$$

where $f_s$ is the optical communication signal frequency, $f_p$ is the optical pump signal frequency, $g_R$ is the Raman gain of the fibre, $P_p(0)$ is the normalised optical pump signal power at z=0, $\alpha_1$, is the loss coefficient of the fibre at the pump signal frequency, and $A_{eff}$ is the effective area of the fibre. The total optical signal power is given by $$S = \frac{g_R P_s(0)}{\alpha_s A_{eff}}$$

where $P_s(0)$ is the optical signal power at z=0, and $\alpha_s$ is the loss coefficient of the fibre at the optical communication signal frequency.

In an embodiment, the controller is configured to calculate the nonlinear enhancement factor as $$NEF = \frac{1}{S}\ln\left(\frac{G_0(z)}{G(z)}\right).$$

In an embodiment, the controller is configured in step b. to select the optical signal power for a plurality of optical communication signals. The optical communication network may be used for wavelength division multiplexed transmission.

In an embodiment, the controller is configured to implement steps a. to d. during an initial configuration of the optical communication network.

In an embodiment, the controller is configured to implement steps a. to d. in response to a change in the number of optical communication signals. The controller may therefore re-optimise the optical signal power whenever the number of optical communication signals transmitted across the network link changes.

In an embodiment, the optical pump signal source comprises a plurality of optical pump signal sub-sources each configured to generate an optical pump sub-signal and an optical signal combiner configured to combine the optical pump sub-signals to form the optical pump signal.

In an embodiment, the optical pump signal source is configured to generate an optical pump signal for single stage Raman pumping.

In an embodiment, the optical pump signal source is configured to generate an optical pump signal for cascaded Raman pumping.

In an embodiment, the optical communication signal power control apparatus comprises one of an optical transmitter and an optical amplifier.

A fourth aspect of the invention provides a data carrier having computer readable instructions embodied therein. The said computer readable instructions are for providing access to resources available on a processor. The computer readable instructions comprise instructions to cause the processor to perform any of the above steps of the method of configuring an optical communication network comprising an optical link comprising an optical fibre configured as a Raman amplifier configured for co-propagating Raman amplification.

In an embodiment, the data carrier is a non-transitory data carrier.

Embodiments of the invention will now be described, by way of example only, with reference to the accompanying drawings.

BRIEF DESCRIPTION OF THE DRAWINGS

FIG. 2 shows the steps of a method according to a second embodiment of the invention of configuring an optical communication network comprising an optical link comprising an optical fibre configured as a Raman amplifier configured for co-propagating Raman amplification;

DETAILED DESCRIPTION

Figure 1:
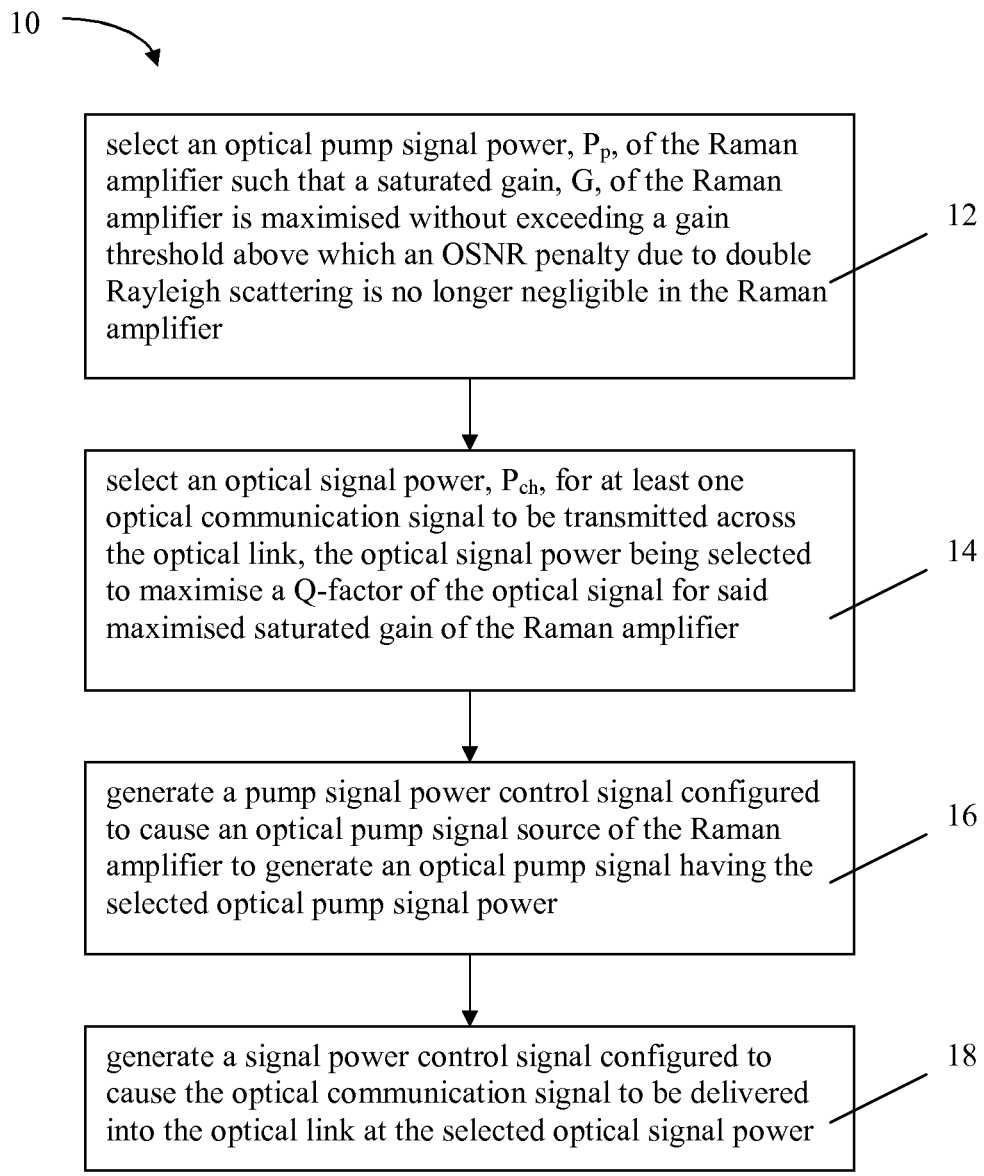
FIG. 1 shows the steps of a method according to a first embodiment of the invention of configuring an optical communication network comprising an optical link comprising an optical fibre configured as a Raman amplifier configured for co-propagating Raman amplification.

A first embodiment of the invention provides a method 10 of configuring an optical communication network. The network comprises an optical link comprising an optical fibre configured as a Raman amplifier. The Raman amplifier is configured for co-propagating Raman amplification.

The method 10 comprises:
a. selecting an optical pump signal power, $P_p$, of the Raman amplifier such that a saturated gain, G, of the Raman amplifier is at a maximum operating level without exceeding a gain threshold above which an optical signal to noise ratio, OSNR, penalty caused by double Rayleigh scattering is no longer negligible in the Raman amplifier 12;
b. selecting an optical signal power, $P_{ch}$, for at least one optical communication signal to be transmitted across the optical link, the optical signal power being selected to maximise a Q-factor of the optical signal when the Raman amplifier is configured for said maximum operating level of the saturated gain 14;
c. generating a pump signal power control signal configured to cause an optical pump signal source of the Raman amplifier to generate an optical pump signal having the selected optical pump signal power 16; and
d. generating a signal power control signal configured to cause the optical communication signal to be delivered into the optical link at the selected optical signal power 18.

It will be appreciated by the person skilled in the art that an optical signal to noise ratio, OSNR, penalty caused by double Rayleigh scattering will always arise in a Raman amplifier but that below a certain gain threshold the OSNR penalty is negligible. That is to say, the OSNR penalty will not result in traffic carried by the optical communication signal being lost or incorrectly identified at optical receiver apparatus in the optical communication network arranged to receive the optical communication signal.

For backward Raman amplification the effective noise figure gets better up to a certain gain, but after that it increases again because of the double Rayleigh scattering. So the gain threshold is set below the gain value at which the noise figure increase cancels all or most of the benefit of the Raman gain. For forward Raman amplification the noise figure is expected to increase with gain, but when double Rayleigh scattering starts to occur the noise figure increases further as a result.Q factor is the bit error rate, BER, expressed through the inverse of the erfc( ) function.

The steps of a method 20 of configuring an optical communication network according to a second embodiment of the invention are shown in FIG. 2. The steps of the method 20 of this embodiment are similar to the steps of the method 10 of the first embodiment, with the following modifications. The same reference numbers are retained for corresponding steps.

In this embodiment, step b. comprises:
i. obtaining an optimal optical signal power, $P_{nl}$, for the optical communication signal at which the Q-factor of the optical communication signal is maximised in the absence of Raman amplification 22;
ii. calculating a nonlinear enhancement factor, NEF, being an optical signal power reduction required to the optimal optical signal power for said maximised saturated gain to avoid an increase in a nonlinear degradation of the optical signal when Raman amplification is applied to the optical communication signal 24; and
iii. calculating 26 an optimal value for the optical signal power, $P_{ch}$, as $$P_{ch}=P_{nl}-NEF$$

A signal power control signal configured to cause the optical communication signal to be delivered into the optical link at the calculated optical signal power is then generated 28.

Figure 3:
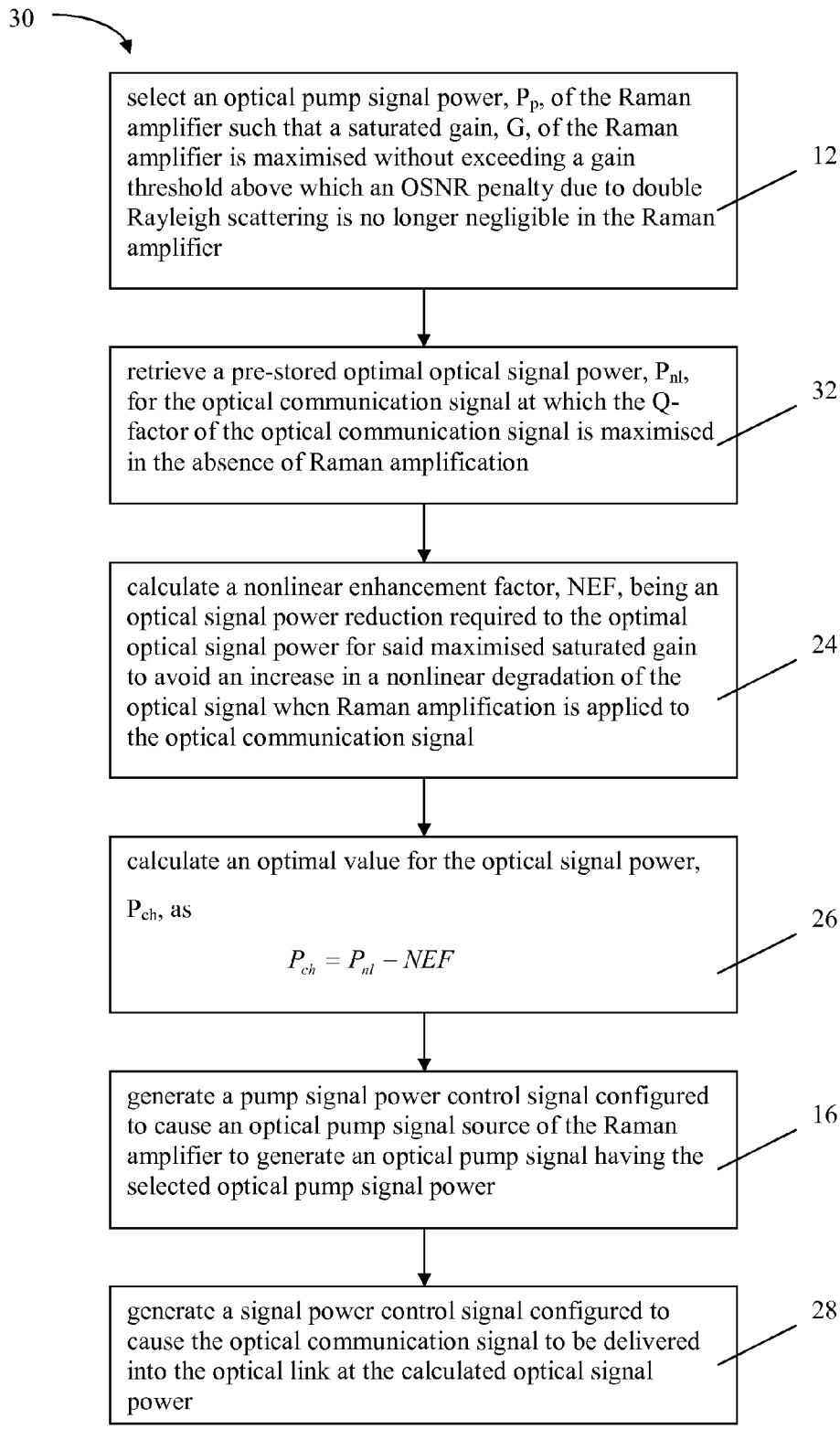
FIG. 3 shows the steps of a method according to a third embodiment of the invention of configuring an optical communication network comprising an optical link comprising an optical fibre configured as a Raman amplifier configured for co-propagating Raman amplification.

The steps of a method 30 of configuring an optical communication network according to a third embodiment of the invention are shown in FIG. 3. The steps of the method 30 of this embodiment are similar to the steps of the method 20 of the second embodiment, with the following modifications. The same reference numbers are retained for corresponding steps.

In this embodiment, the optimal optical signal power in the absence of Raman amplification, $P_{nl}$, is obtained by determining a number of optical communication signals, $N_{ch}$, to be transmitted across the optical link. A pre-stored value of $P_{nl}$ is then retrieved in dependence on the number of optical communication signals 32. It will be appreciated that the pre-stored value of $P_{nl}$ may alternatively be retrieved in dependence on the type of the optical fibre or the modulation format of the optical communication signals, or a combination of any of these three parameters.

Figure 4:
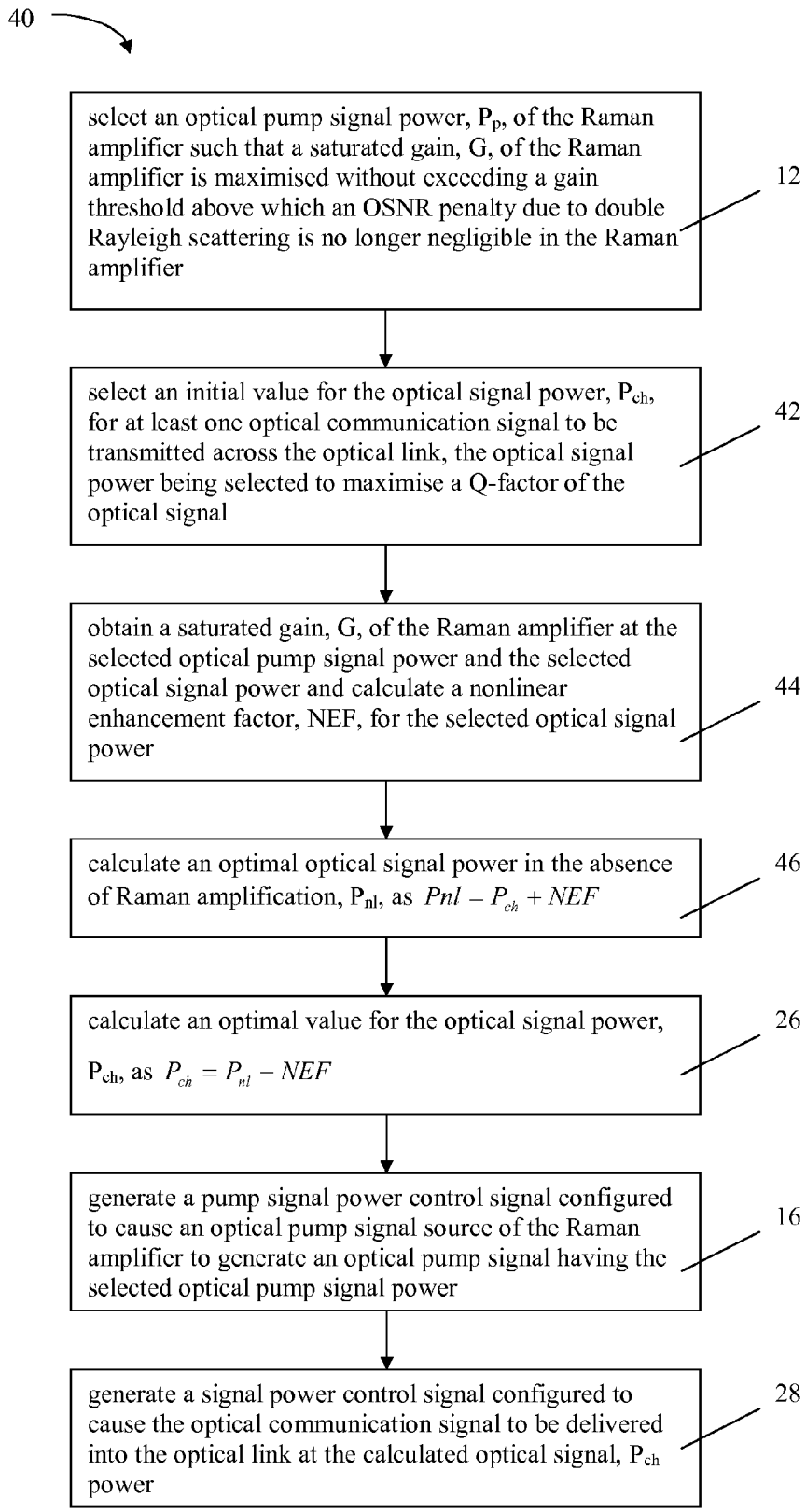
FIG. 4 shows the steps of a method according to a fourth embodiment of the invention of configuring an optical communication network comprising an optical link comprising an optical fibre configured as a Raman amplifier configured for co-propagating Raman amplification.

The steps of a method 40 of configuring an optical communication network according to a fourth embodiment of the invention are shown in FIG. 4. The steps of the method 40 of this embodiment are similar to the steps of the method 20 of the second embodiment, with the following modifications. The same reference numbers are retained for corresponding steps.

In this embodiment, step a. comprises selecting an initial value for the optical signal power 42 for at least one optical communication signal to be transmitted across the optical link. The initial value of the optical signal power is manually set by an engineer in the field to maximise a Q-factor of the optical signal, for an initial value of the optical pump signal, also manually set by the engineer.

Figure 5:
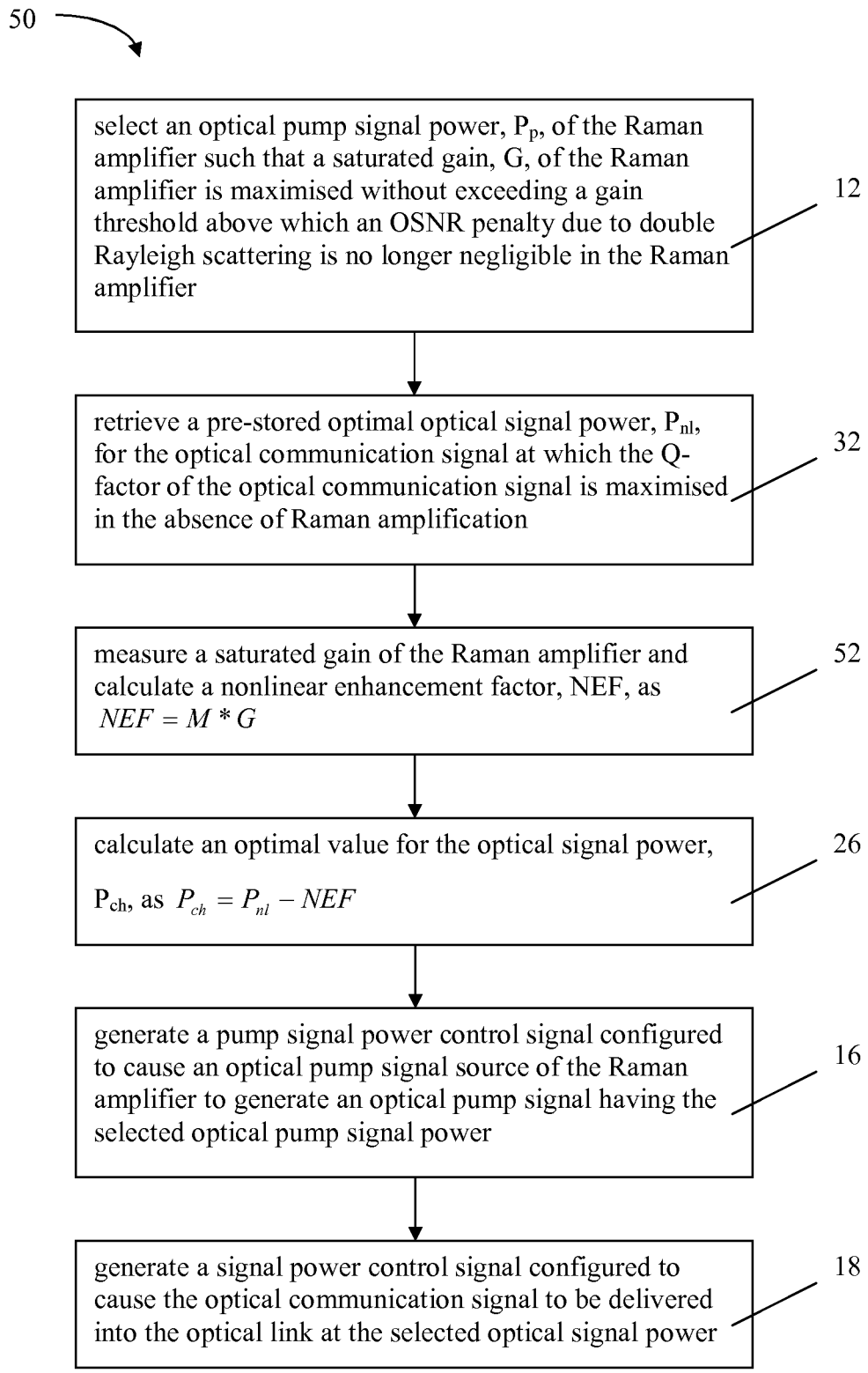
FIG. 5 shows the steps of a method according to a fifth embodiment of the invention of configuring an optical communication network comprising an optical link comprising an optical fibre configured as a Raman amplifier configured for co-propagating Raman amplification.

Step b. further comprises obtaining a value for the saturated gain, G, of the Raman amplifier at the manually set optical pump signal power and optical signal power. Step b. comprises calculating a nonlinear enhancement factor, NEF, for the manually set optical signal power 44. An optimal optical signal power in the absence of Raman amplification, $P_{nl}$, is then calculated 46 as $P_{nl}=P_{ch}+NEF$ The steps of a method 50 of configuring an optical communication network according to a fifth embodiment of the invention are shown in FIG. 5. The steps of the method 50 of this embodiment are similar to the steps of the method 30 of the third embodiment, with the following modifications. The same reference numbers are retained for corresponding steps.

In this embodiment, a saturated gain of the Raman amplifier is measured and the nonlinear enhancement factor is calculated 52 as NEF=M*G. M is a scaling factor in the range 0.7-0.8. The value of M may be calibrated, by measurement or modelling, for a specific Raman pumping scheme which is to be used.

Figure 6:
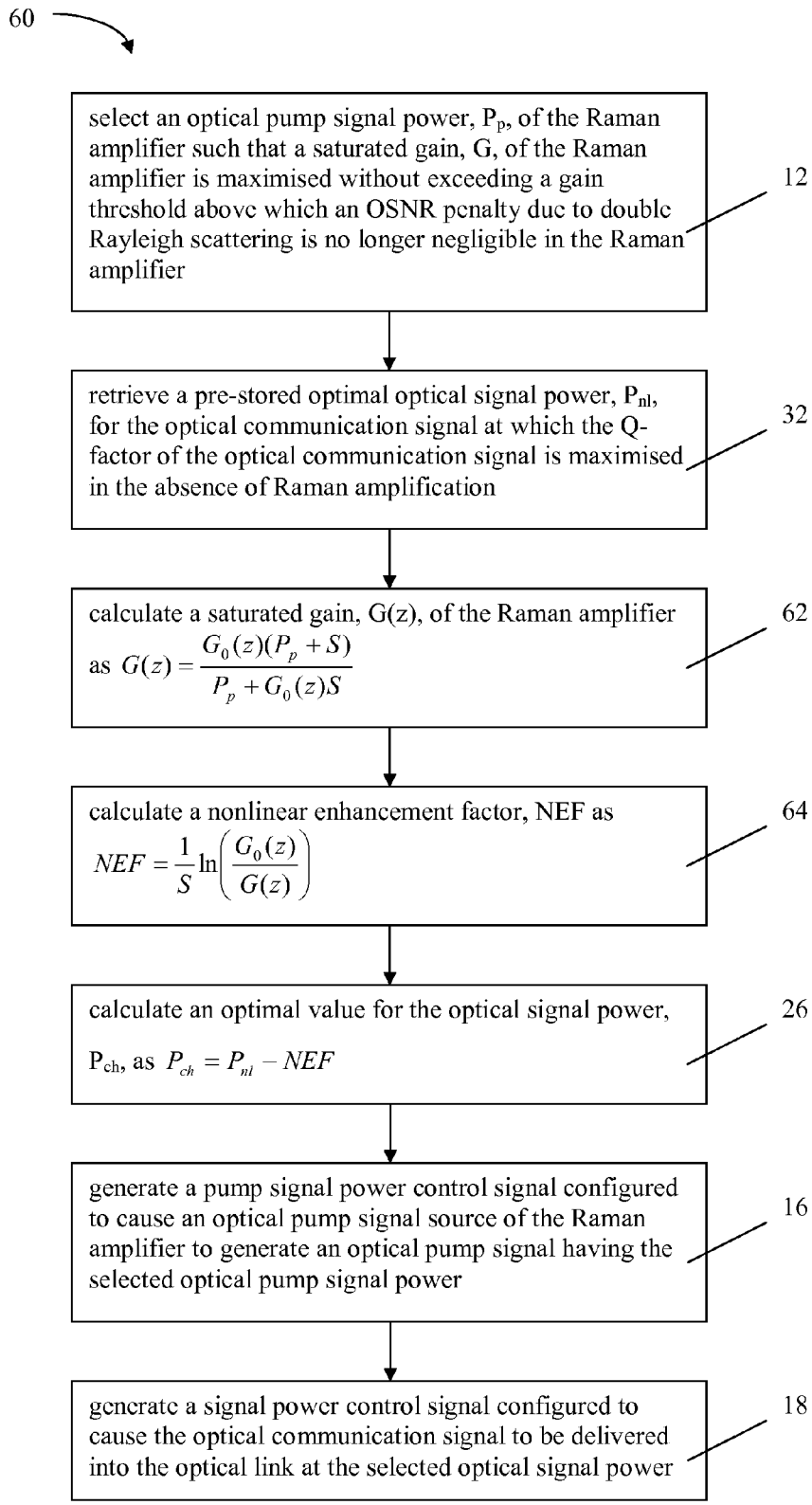
FIG. 6 shows the steps of a method according to a sixth embodiment of the invention of configuring an optical communication network comprising an optical link comprising an optical fibre configured as a Raman amplifier configured for co-propagating Raman amplification.

The steps of a method 60 of configuring an optical communication network according to a sixth embodiment of the invention are shown in FIG. 6. The steps of the method 60 of this embodiment are similar to the steps of the method 30 of the third embodiment, with the following modifications. The same reference numbers are retained for corresponding steps.

In this embodiment, the saturated gain, G(z), is calculated 62 as $$G(z) = \frac{G_0(z)(P_p + S)}{P_p + G_0(z)S},$$

where z is a distance along the optical link, S is the normalised total optical signal power, $P_p$ is the normalised optical pump signal power, and $G_0(z)$ is the unsaturated gain of the Raman amplifier.

The nonlinear enhancement factor is calculated 64 as the ratio of the effective lengths of the Raman amplifier with and without Raman amplification, which can be given as $$NEF = \frac{1}{S}\ln\left(\frac{G_0(z)}{G(z)}\right).$$

Figure 7:
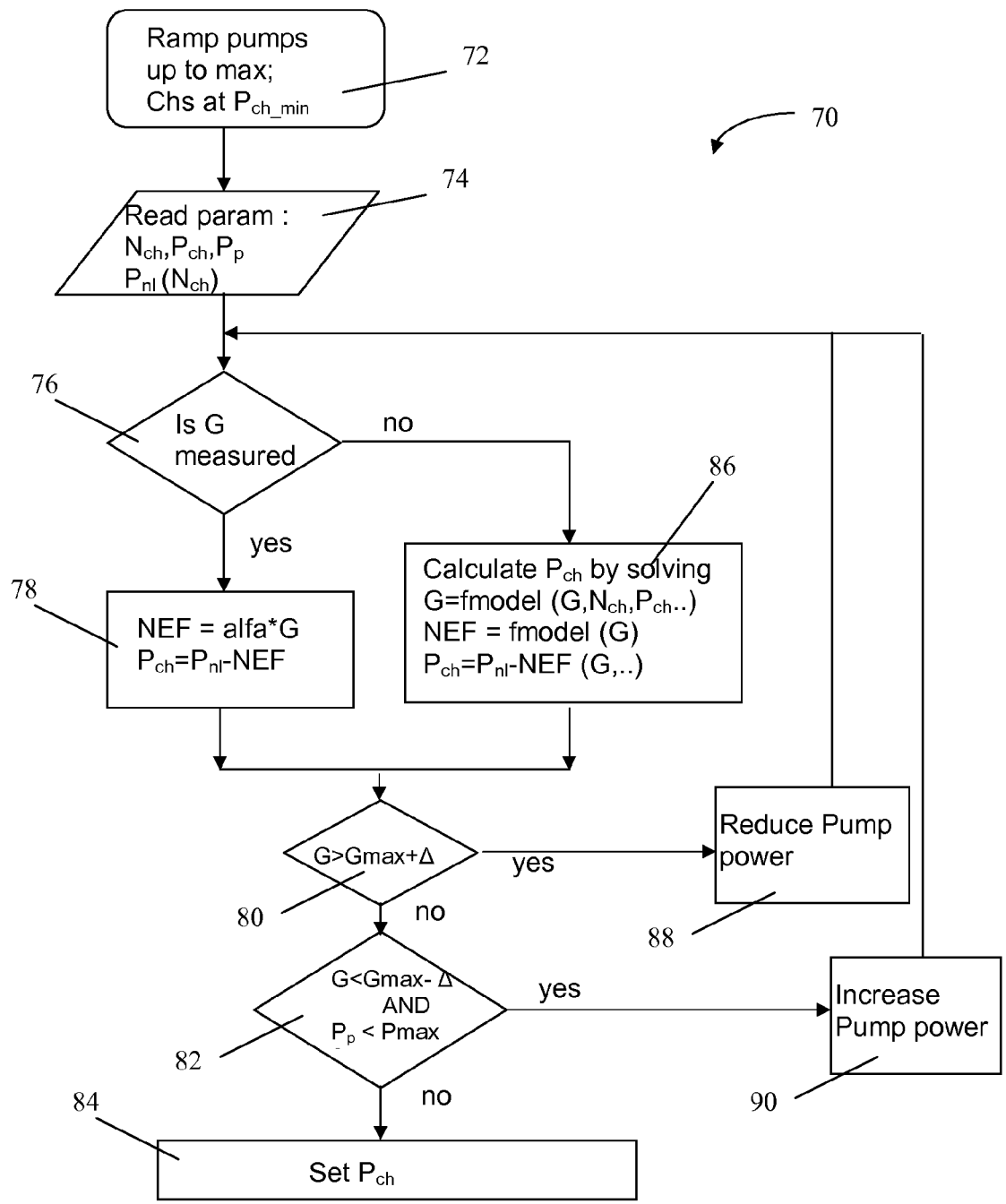
FIG. 7 shows the steps of a method according to a seventh embodiment of the invention of configuring an optical communication network comprising an optical link comprising an optical fibre configured as a Raman amplifier configured for co-propagating Raman amplification.

The steps of a method 70 of configuring an optical communication network according to a seventh embodiment of the invention are shown in FIG. 7. The configuration of an optical communication network with co-propagating Raman amplification requires setting of the optical pump signal power and the optical signal power for the optical communication signals to be transmitted across the network. This embodiment enables automatic selection of the optical signal power.

The method 70 comprises ramping the optical pump signal power up to the maximum power, $P_{max}$, that the respective optical signal pump sources are able to generate 72. The optical signal power is set to a minimum operating value, $P_{ch\_min}$. A number of system parameters of the optical communication network are then acquired 74: the number of optical communications signals, $N_{ch}$ is determined; the currently set optical signal power, $P_{ch}$, is determined; the currently set optical pump signal power, $P_p$, is determined; and the optimal optical signal power in the absence of Raman amplification, $P_{nl}$, is retrieved in dependence on $N_{ch}$.

The method 70 then proceeds in two different ways depending upon whether the saturated gain, G, of the Raman amplifier is measured 76.

If the gain is measured, the nonlinear enhancement factor, NEF, is calculated 78 as NEF=M*G, where G is the measured saturated gain and M is typically approximately 0.8. This equation for NEF has been empirically obtained and proved by simulation. An optimal value for the optical signal power is then calculated 78 as $P_{ch}=P_{nl}-NEF$.

If the gain is not measured it is determined from other parameters of the optical communication network, using a gain saturation model of the Raman amplifier, for single order Raman pumping, which takes into account both gain saturation of the optical pump signal and nonlinear impairments as follows.

The saturated gain, G(z), is calculated 86 as $$G(z) = \frac{G_0(z)(P_p + S)}{P_p + G_0(z)S},$$

where z is a distance along the optical link, S is the normalised total optical signal power, $P_p$ is the normalised optical pump signal power, and $G_0(z)$ is the unsaturated gain of the Raman amplifier. This equation enables the saturated gain to be calculated while taking into account gain saturation by the optical communication signals.

The unsaturated gain of the Raman amplifier is given by $G_0(z)=\exp((P_p+S)(1-e^{-\alpha z}))$, where $\alpha$ is the loss coefficient of the optical link at a wavelength of the optical communication signal.

The normalised optical pump signal power is given by $$P_p = \frac{f_s g_R P_p(0)}{f_p \alpha_p A_{eff}}$$

where $f_s$ is the optical communication signal frequency, $f_p$ is the optical pump signal frequency, $g_R$ is the Raman gain of the fibre, $P_p(0)$ is the normalised optical pump signal power at z=0, $\alpha_p$ is the loss coefficient of the fibre at the pump signal frequency, and $A_{eff}$ is the effective area of the fibre. The normalised total optical signal power is given by $$S = \frac{g_R P_s(0)}{\alpha_s A_{eff}}$$

where $P_s(0)$ is the optical signal power at z=0, and $\alpha_s$ is the loss coefficient of the fibre at the optical communication signal frequency.

The enhancement of nonlinear impairments due to distributed Raman gain is taken into account by the nonlinear enhancement factor, NEF, which is defined as the ratio of the Effective Lengths of the optical link with and without Raman amplification:

$$\frac{L_{eff}}{L_{eff,noRaman}} = \frac{1}{S}\ln\left(\frac{P+G_0 S}{P+S}\right) = \frac{1}{S}\ln\left(\frac{G_0}{G}\right)$$

The nonlinear enhancement factor says how much to lower the optical signal power by in order to not incur an increase in nonlinear impairments. The nonlinear enhancement in factor is calculated 86 in this embodiment as $$NEF = \frac{1}{S}\ln\left(\frac{G_0(z)}{G(z)}\right).$$

Given the optimal optical signal power in the absence of Raman amplification, $P_{nl}$, an optimal value for the optical signal power in the presence of co-propagating Raman amplification is then calculated 86 as $P_{ch}=P_{nl}-NEF$.

The Raman link budget improvement is given by $P_{ch}+G-P_{nl}=G-NEF$.

Following selection of the optical signal power, $P_{ch}$, the method 70 proceeds by checking 80 whether the value of the saturated gain, G, determined in the previous steps by measurement or calculation is greater than the gain threshold, $G_{max}$, of the Raman amplifier plus a hysteresis parameter, $\Delta$. The hysteresis parameter, $\Delta$, is selected to be larger than the network tolerance to avoid oscillations in the optical signal power but is small enough so that G is not selected to have a value which would degrade the performance, i.e. reduce the Q-factor, of the communication network. $\Delta$ typically has a value of approximately 0.5 dB in this embodiment. If $G>G_{max}+\Delta$, the optical pump signal power is reduced 88, in order to reduce the saturated gain, and the method repeats the loop of determining G, NEF and $P_{ch}$.

If $G \leq G_{max}+\Delta$, the method 70 proceeds to checking 82 whether $G<G_{max}-\Delta$ and whether $P_p<P_{max}$, in case the optical pump signal power has previously been reduced and can now be increased again. If both conditions are met, the optical pump signal power is increased 90. If either condition is not met, the optical pump signal power is maintained and the optical signal power is set 84 to the value, $P_{ch}$, in the previous steps 78, 86.

$G_{max}$ may be a pre-selected value which is set by a manufacturer of an optical pump signal source configured to generate the optical pump signal. Alternatively, $G_{max}$ may be determined by characterisation measurements of the optical pump signal source configured to generate the optical pump signal.

Where the saturated gain is measured, the method 70 will typically require the steps of the pump signal power being reduced 88 or increased 90 and the optimal value for the optical signal power being recalculated 78 to be carried out at least once.

If the number of optical communication signals, $N_{ch}$, changes the method 70 may be recommenced at the step of acquiring system parameters 74.

With this method the optical signal power launched into the optical link may be optimised, accounting for both pump depletion and nonlinear impairments. Furthermore, no Raman pump signal power is wasted since the method of this embodiment sets the optical pump signal power to a maximum available value. Provided that the gain, G, is not higher than the gain threshold, $G_{max}$, to avoid secondary effects including Double Rayleigh Scattering, the method of this embodiment enables best performance for an optical communication network to achieved by configuring the Raman amplifier to have the maximum acceptable gain, by setting the pump sources to their maximum pump signal power, and setting the optical signal power such that nonlinear degradation is not caused during propagation of the optical communication signals across the optical link.

In fact, it has been found that for a given nonlinear penalty, increasing the Raman amplifier gain requires an optical signal power reduction of less than 1 dB per dB of gain increase, thus improving the optical signal to noise ratio, ONSR, and reach of the optical communication network. The higher the gain, the higher the benefit.

It will be appreciated by the person skilled in the art that an OSNR penalty caused by double Rayleigh scattering, DRS, will always arise in a Raman amplifier, and an OSNR penalty due to relative intensity noise transfer, RIN, may also arise. The gain threshold, $G_{max}$, is selected such that the OSNR penalty due to DRS and RIN is negligible, which here means less than 0.5 dB due to DRS and less than 0.1 dB due to RIN.

For backward Raman amplification the effective noise figure gets better up to a certain gain, but after that it increases again because of the DRS. So the gain threshold is set below the gain value at which the noise figure increase cancels all or most of the benefit of the Raman gain. For forward Raman amplification the noise figure is expected to increase with gain, but when DRS starts to occur the noise figure increases further as a result. Where the optical communication signal has a high power before Raman amplification the main source of OSNR is expected to be RIN transfer.

Figure 8:
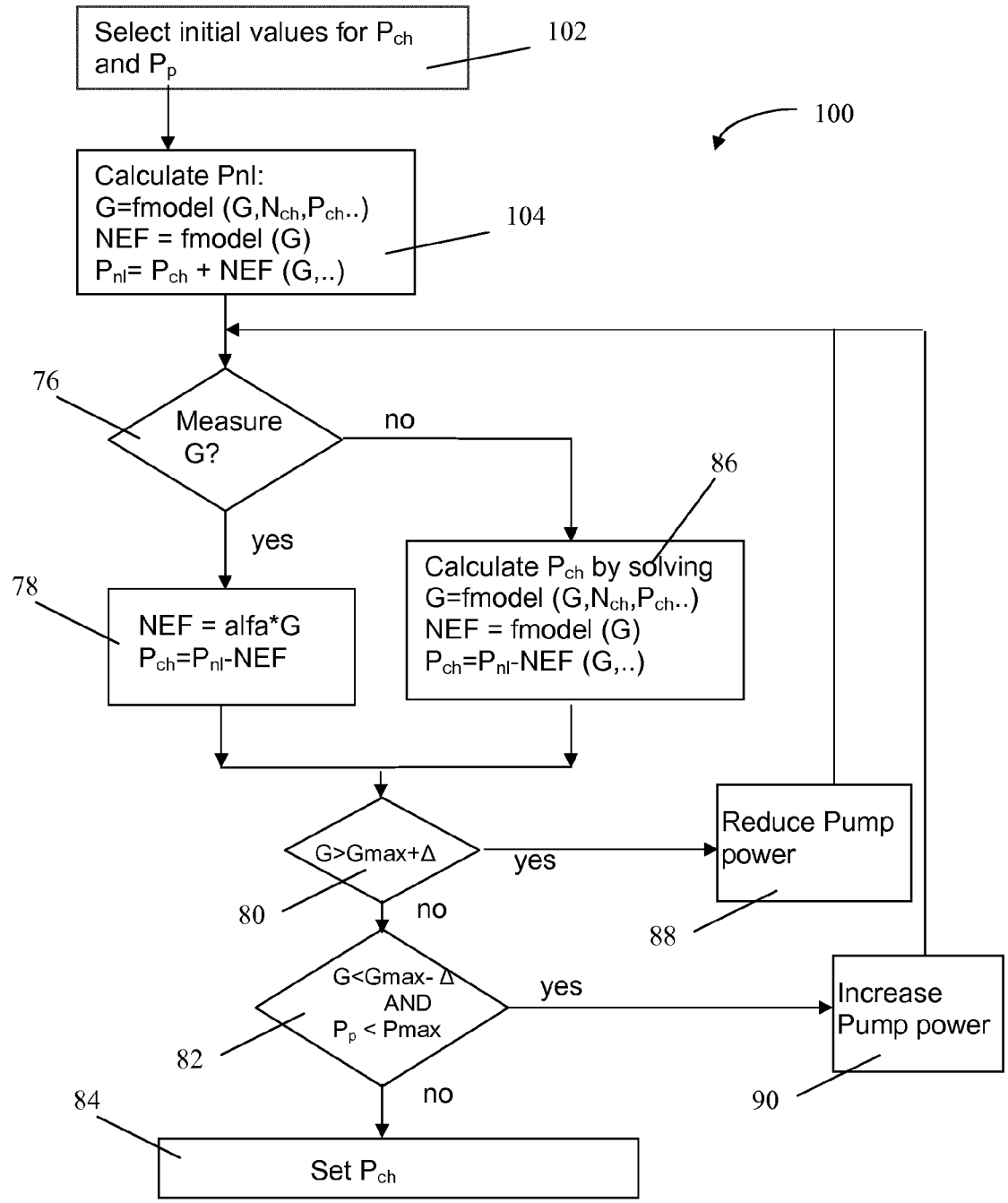
FIG. 8 shows the steps of a method according to an eighth embodiment of the invention of configuring an optical communication network comprising an optical link comprising an optical fibre configured as a Raman amplifier configured for co-propagating Raman amplification.

The steps of a method 100 of configuring an optical communication network according to an eighth embodiment of the invention are shown in FIG. 8. The method 100 of this embodiment is similar to the method 70 of FIG. 7, with the following modifications. The same reference numbers are retained for corresponding features.

In this embodiment, the method 100 commences with an engineer manually setting initial values 102 for the optical signal power, $P_{ch}$, and the optical pump signal power, $P_p$.

The optimal optical signal power in the absence of Raman amplification, $P_{nl}$, is then calculated 104 by determining the saturated gain, G(z) and nonlinear enhancement factor, NEF, for the initially set values for $P_{ch}$ and $P_p$, using the following equations, as described above:

$$G(z) = \frac{G_0(z)(P_p+S)}{P_p+G_0(z)S}$$

$$G_0(z) = \exp((P_p+S)(1-e^{-\alpha z}))$$

$$NEF = \frac{1}{S}\ln\left(\frac{G_0(z)}{G(z)}\right)$$

$P_{nl}$ is calculated as $P_{nl}=P_{ch}+NEF$

Figure 9:
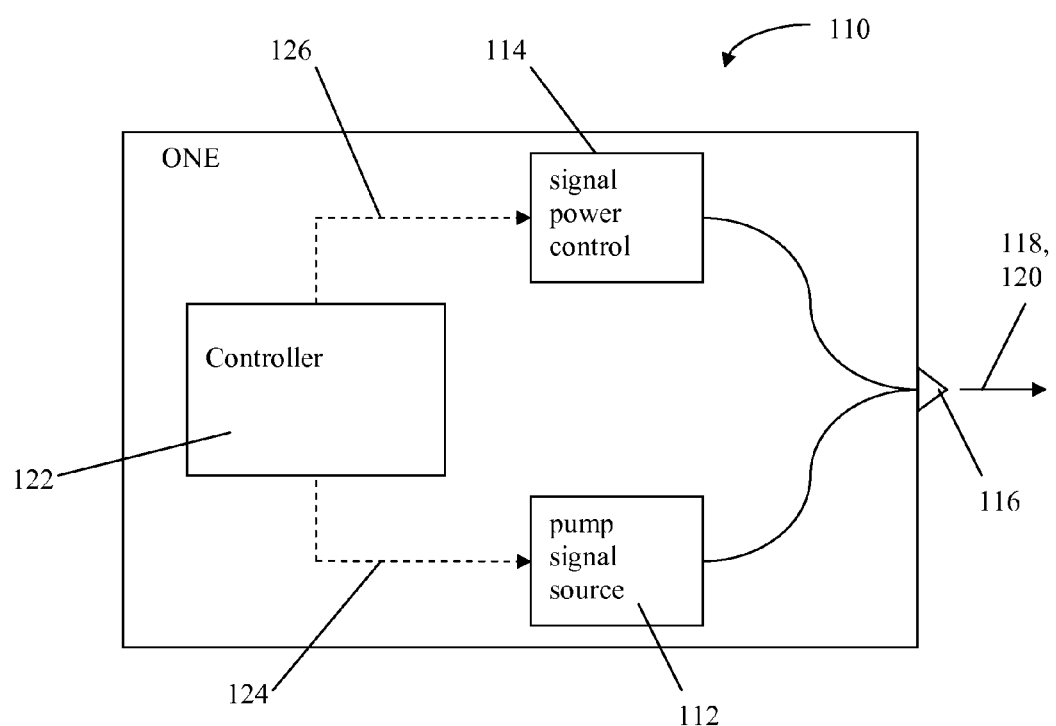
FIG. 9 is a schematic representation of an optical network element according to a ninth embodiment of the invention.

An optical communication network element, ONE, 110 according to a ninth embodiment of the invention is shown in FIG. 9. The ONE 110 comprises an optical pump signal source 112, optical communication signal power control apparatus 114, an output 116 and a controller 122.

The output 116 is configured to output at least one optical communication signal 118 and a co-propagating optical pump signal 120 to be delivered to an optical link comprising an optical fibre configured as a Raman amplifier.

The controller 122 is configured to:
a. select an optical pump signal power, $P_p$, such that a saturated gain, G, of the Raman amplifier is at a maximum operating level without exceeding a gain threshold above which an optical signal to noise ratio penalty caused by double Rayleigh scattering is no longer negligible in the Raman amplifier;
b. select an optical signal power, $P_{ch}$, for the at least one optical communication signal, the optical signal power being selected to maximise a Q-factor of the optical signal when the Raman amplifier is configured for said maximum operating level of the saturated gain;

c. generate a pump power control signal 124 configured to cause the optical pump signal source of the Raman amplifier to generate an optical pump signal having the selected optical pump signal power; and d. generate a signal power control signal 126 configured to cause the optical communication signal power control apparatus to set the optical signal power of the at least one optical communication signal to the selected optical signal power.

It will be appreciated by the person skilled in the art that double Rayleigh scattering, DRS, will always be caused in a Raman amplifier but that below a certain threshold the optical signal to noise ratio, OSNR, penalty caused by the DRS is negligible. That is to say, the OSNR penalty will not result in traffic carried by the optical communication signal being lost or incorrectly identified at optical receiver apparatus in the optical communication network arranged to receive the optical communication signal.

A tenth embodiment of the invention provides an optical communication network element, ONE, which is similar to the ONE 110 shown in FIG. 9 and which will be described with reference to FIG. 9.

In this embodiment, the controller 122 is configured to, in step b.:

i. obtain an optimal optical signal power, $P_{nl}$, for the optical communication signal at which the Q-factor of the optical communication signal is maximised in the absence of Raman amplification;

ii. calculate a nonlinear enhancement factor, NEF, being an optical signal power reduction required to the optimal optical signal power for said maximised saturated gain to avoid an increase in a nonlinear degradation of the optical signal when Raman amplification is applied to the optical communication signal; and iii. calculate an optimal value for the optical signal power, $P_{ch}$, as $$P_{ch}=P_{nl}\text{-NEF}$$

An eleventh embodiment of the invention provides an optical communication network element, ONE, which is similar to the ONE 110 shown in FIG. 9 and which will be described with reference to FIG. 9.

In this embodiment, the controller 122 is configured in step b.i. to determine a number of optical communication signals, $N_{ch}$, to be delivered to the optical link. The controller is configured to obtain the optimal optical signal power, $P_{nl}$, by retrieving a pre-stored value of $P_{nl}$ in dependence on the number of optical communication signals. It will be appreciated that the controller 122 may alternatively be configured to retrieve a pre-stored value of $P_{nl}$ in dependence on the type of the optical fibre or the modulation format of the optical communication signals, or a combination of any of these three parameters.

A twelfth embodiment of the invention provides an optical communication network element, ONE, which is similar to the ONE 110 shown in FIG. 9 and which will be described with reference to FIG. 9.

In this embodiment, the controller 122 is configured to operate following an engineer manually setting initial values for the optical signal power, $P_{ch}$, and the optical pump signal power, $P_p$.

The controller is configured, in step b., to obtain a value for the saturated gain, G, of the Raman amplifier at the selected initial value for the optical pump signal power and the selected initial value for the optical signal power. The controller is configured to calculate a nonlinear enhancement factor, NEF, for the selected initial value for optical signal power and to calculate an optimal optical signal power in the absence of Raman amplification, $P_{nl}$, as $$P_{nl}=P_{nl}\text{-NEF}$$

Figure 10:
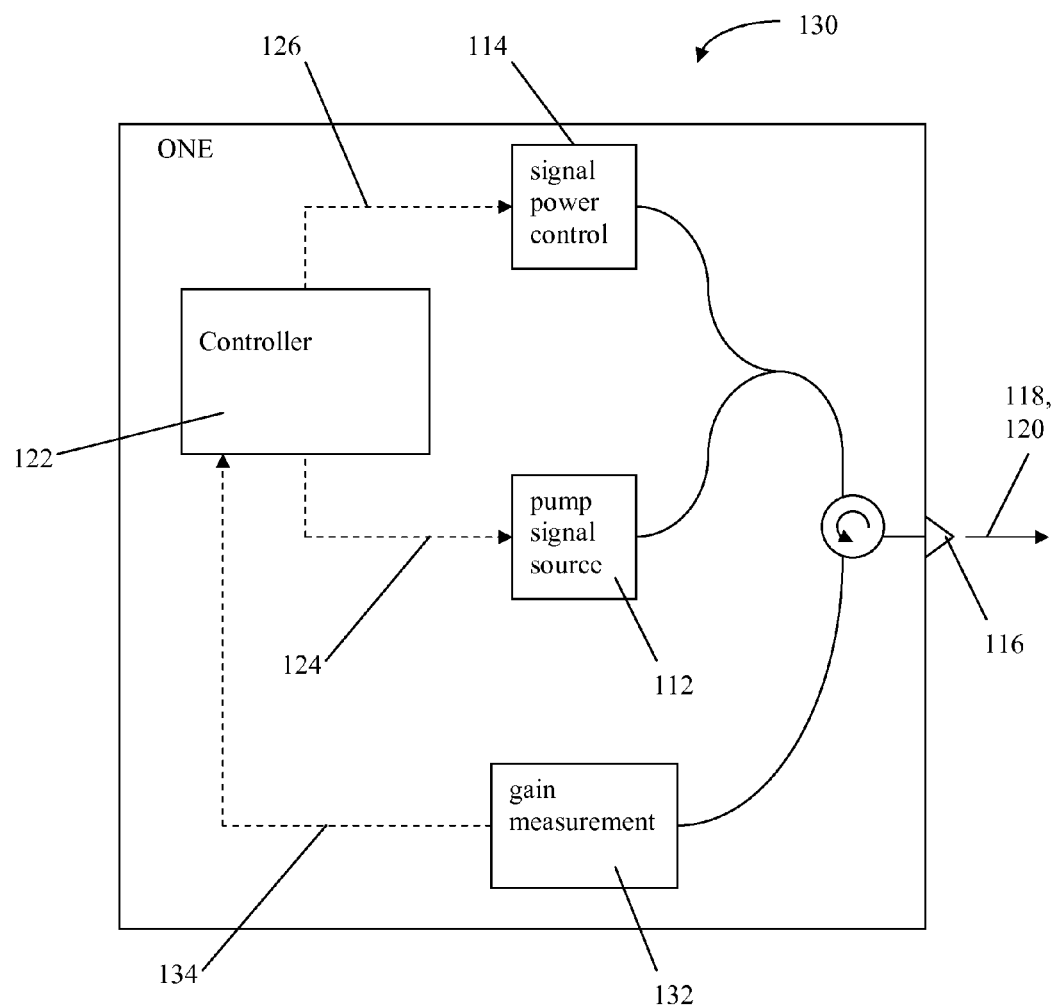
FIG. 10 is a schematic representation of an optical network element according to a thirteenth embodiment of the invention.

A thirteenth embodiment of the invention provides an optical communication network element, ONE, 130 as shown in FIG. 10. The ONE 130 of this embodiment is similar to the ONE 110 shown in FIG. 9, with the following modifications. The same reference numbers are retained for corresponding features.

In this embodiment, the ONE 130 comprises gain measurement apparatus 132 configured to measure the saturated gain of the Raman amplifier. The controller 122 is configured to receive the measured saturated gain, G, and to calculate the nonlinear enhancement factor as NEF=M*G. M is in the range 0.7-0.8.

A fourteenth embodiment of the invention provides an optical communication network element, ONE, which is similar to the ONE 110 shown in FIG. 9 and which will be described with reference to FIG. 9.

In this embodiment, the controller 122 is configured to calculate saturated gain, G(z), as $$G(z) = \frac{G_0(z)(P_p + S)}{P_p + G_0(z)S},$$

where z is a distance along the optical link, S is the normalised total optical signal power, $P_p$ is the normalised optical pump signal power, and $G_0(z)$ is the unsaturated gain of the Raman amplifier. The unsaturated gain is given by $G_0(z)=\exp((P_p+S)(1-e^{-\alpha z}))$, where $\alpha$ is the loss coefficient of the optical link at a wavelength of the optical communication signal.

The normalised optical pump signal power is given by $$P_p = \frac{f_s g_R P_p(0)}{f_p \alpha_p A_{\mathit{eff}}}$$

where $f_s$ is the optical communication signal frequency, $f_p$ is the optical pump signal frequency, $g_R$ is the Raman gain of the fibre, $P_p(0)$ is the normalised pump signal power at z=0, $\alpha_p$ is the loss coefficient of the fibre at the pump signal frequency, and $A_{\mathit{eff}}$ is the effective area of the fibre. The normalised total optical signal power is given by $$S = \frac{g_R P_s(0)}{\alpha_s A_{\mathit{eff}}}$$

where $P_s(0)$ is the optical signal power at z=0, and $\alpha_s$ is the loss coefficient of the fibre at the optical communication signal frequency.

The controller is configured to calculate the nonlinear enhancement factor as the ratio of the effective lengths of the Raman amplifier with and without Raman amplification:

$$\frac{L_{\mathit{eff}}}{L_{\mathit{eff},noRaman}} = \frac{1}{S}\ln\left(\frac{P + G_0 S}{P + S}\right) = \frac{1}{S}\ln\left(\frac{G_0}{G}\right)$$

In this embodiment, the controller 122 is configured to calculate the nonlinear enhancement factor as $$NEF = \frac{1}{S}\ln\left(\frac{G_0(z)}{G(z)}\right).$$

Figure 11:
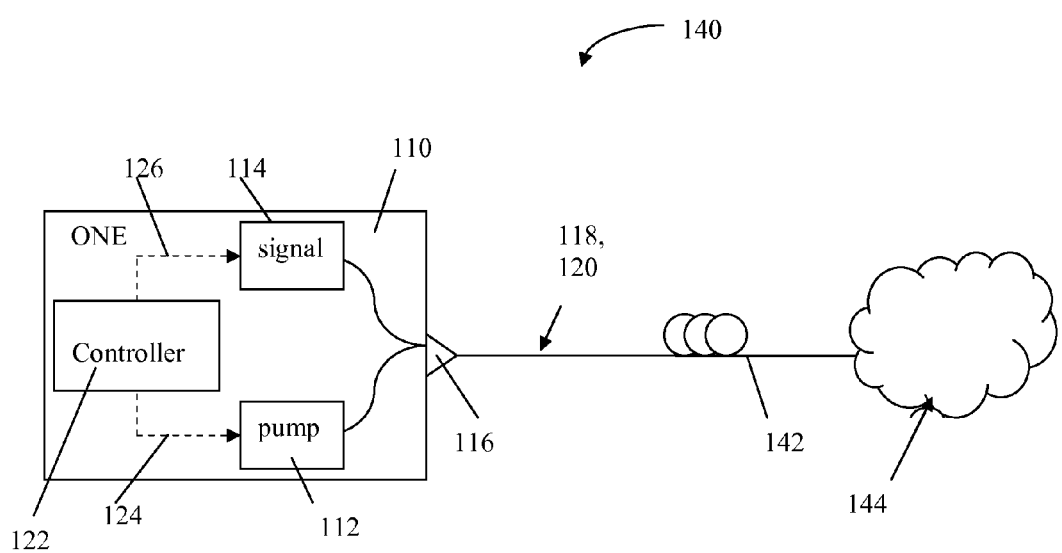
FIG. 11 is a schematic representation of an optical communication network according to a fifteenth embodiment of the invention.

A fifteenth embodiment of the invention provides an optical communication network 140 as shown in FIG. 11. The optical communication network comprises an optical link 142 and an optical communication network element, ONE, 110.

The optical link 142 comprises an optical fibre configured as a Raman amplifier. The Raman amplifier is configured for co-propagating Raman amplification. The optical communication network element 110 is as shown in FIG. 9, according to any one of the ninth to fourteenth embodiments.

It will be appreciated by the person skilled in the art that an OSNR penalty caused by double Rayleigh scattering will always be caused in a Raman amplifier but that below a certain threshold it is negligible. That is to say, the OSNR penalty will not result in traffic carried by the optical communication signal being lost or incorrectly identified at optical receiver apparatus in the optical communication network arranged to receive the optical communication signal.

A sixteenth embodiment of the invention provides a data carrier having computer readable instructions embodied therein. The computer readable instructions are for providing access to resources available on a processor and comprise instructions to cause the processor to perform any of the steps of the method of configuring an optical communication network comprising an optical link comprising a Raman amplifier configured for co-propagating Raman amplification as described above in relation to FIGS. 1 to 8.

The invention claimed is:

1. A method of configuring an optical communication network comprising an optical link comprising an optical fibre configured as a Raman amplifier configured for co-propagating Raman amplification, the method comprising:
   a. selecting an optical pump signal power ($P_p$) of the Raman amplifier such that a saturated gain (G) of the Raman amplifier is at a maximum operating level without exceeding a gain threshold above which an optical signal to noise ratio penalty caused by double Rayleigh scattering is no longer negligible in the Raman amplifier;
   b. selecting an optical signal power ($P_{ch}$) for at least one optical communication signal to be transmitted across the optical link, the optical signal power being selected to maximise a Q-factor of the optical signal when the Raman amplifier is configured for said maximum operating level of the saturated gain;
   c. generating a pump signal power control signal configured to cause an optical pump signal source of the Raman amplifier to generate an optical pump signal having the selected optical pump signal power; and
   d. generating a signal power control signal configured to cause the optical communication signal to be delivered into the optical link at the selected optical signal power.

2. The method as claimed in claim 1, wherein selecting the optical signal power comprises:
   i. obtaining an optimal optical signal power ($P_{nl}$) for the optical communication signal at which the Q-factor of the optical communication signal is maximised in an absence of Raman amplification;
   ii. calculating a nonlinear enhancement factor (NEF) being an optical signal power reduction required to the optimal optical signal power for said maximised saturated gain to avoid an increase in a nonlinear degradation of the optical signal when Raman amplification is applied to the optical communication signal; and
   iii. calculating an optimal value for the optical signal power ($P_{ch}$) as $$P_{ch} = P_{nl} - NEF.$$

3. The method as claimed in claim 2, wherein the optimal optical signal power in the absence of Raman amplification ($P_{nl}$) is obtained by determining a number of optical communication signals ($N_{ch}$) to be transmitted across the optical link and retrieving a pre-stored value of $P_{nl}$ in dependence on at least one of the number of optical communication signals, a characteristic of the optical fibre and a modulation format of the optical communication signals.

4. The method as claimed in claim 2, wherein selecting the optical pump signal power of the Raman amplifier comprises selecting an initial value for the optical signal power and wherein selecting the optical signal power for at least one optical communication signal to be transmitted across the optical link further comprises obtaining a value for the G of the Raman amplifier at the selected optical pump signal power and the selected optical signal power, and calculating a nonlinear enhancement factor (NEF) for the selected optical signal power, and calculating an optimal optical signal power in an absence of Raman amplification ($P_{nl}$) as $P_{nl} = P_{ch} + NEF$.

5. The method as claimed in claim 2, wherein the saturated gain is obtained by measurement and the nonlinear enhancement factor is calculated as NEF=M*G, where M is in a range 0.7-0.8.

6. The method as claimed in claim 2, wherein saturated gain (G(z)) is calculated as, $$G(z) = \frac{G_0(z)(P_p + S)}{P_p + G_0(z)S},$$

where z is a distance along the optical link, S is a normalised total optical signal power ($P_p$) is a normalised optical pump signal power, and $G_0(z)$ is an unsaturated gain of the Raman amplifier.

7. The method as claimed in claim 6, wherein $G_0(z)$ is given by $G_0(z) = \exp((P_p+S)(1-e^{-\alpha z}))$, where $\alpha$ is a loss coefficient of the optical link at a wavelength of the optical communication signal, and wherein the nonlinear enhancement factor is calculated as a ratio of effective lengths of the Raman amplifier with and without Raman amplification and wherein the normalised optical pump signal power is given by $$P_p = \frac{f_s g_R P_p(0)}{f_p \alpha_p A_{eff}}$$

where $f_s$ is an optical communication signal frequency, $f_p$ is an optical pump signal frequency, $g_R$ is a Raman gain of the optical fibre, $P_p(0)$ is a normalised pump signal power at $z=0$, $\alpha_p$ is a loss coefficient of the optical fibre at the optical pump signal frequency, and $A_{eff}$ is an effective area of the optical fibre, and the normalised total optical signal power is given by $$S = \frac{g_R P_s(0)}{\alpha_s A_{eff}}$$

where Ps(0) is an optical signal power at z=0, and s is a loss coefficient of the optical fibre at the optical communication signal frequency.

8. The method as claimed in claim 6, wherein the nonlinear enhancement factor is calculated as $$NEF = \frac{1}{S}\ln\left(\frac{G_0(z)}{G(z)}\right).$$

9. An optical communication network element comprising:
  an optical pump signal source;
  an optical communication signal power control apparatus;
  an output configured to output at least one optical communication signal and a co-propagating optical pump signal to be delivered to an optical link comprising an optical fibre configured as a Raman amplifier; and
  a controller configured to:
    a. select an optical pump signal power ($P_p$) such that a saturated gain (G) of the Raman amplifier is at a maximum operating level without exceeding a gain threshold above which an optical signal to noise ratio penalty caused by double Rayleigh scattering is no longer negligible in the Raman amplifier;
    b. select an optical signal power ($P_{ch}$) for the at least one optical communication signal, the optical signal power being selected to maximise a Q-factor of the optical signal when the Raman amplifier is configured for said maximum operating level of the saturated gain;
    c. generate a pump power control signal configured to cause the optical pump signal source of the Raman amplifier to generate an optical pump signal having the selected optical pump signal power; and
    d. generate a signal power control signal configured to cause the optical communication signal power control apparatus to set the optical signal power of the at least one optical communication signal to the selected optical signal power.

10. The optical communication network element as claimed in claim 9, wherein selecting the optical signal power for the at least one optical communication signal comprises the controller to:
  i. obtain an optimal optical signal power ($P_{nl}$) for the optical communication signal at which the Q-factor of the optical communication signal is maximised in an absence of Raman amplification;
  ii. calculate a nonlinear enhancement factor (NEF) being an optical signal power reduction required to the optimal optical signal power for said maximised saturated gain to avoid an increase in a nonlinear degradation of the optical signal when Raman amplification is applied to the optical communication signal; and
  iii. calculate an optimal value for the optical signal power ($P_{ch}$) as $P_{ch}=P_{nl}-NEF$.

11. The optical communication network element as claimed in claim 10, wherein obtaining the optimal optical signal power for the optical communication signal comprises the controller to determine a number of optical communication signals ($N_{ch}$) to be delivered to the optical link and is configured to obtain the optimal optical signal power ($P_{nl}$) by retrieving a pre-stored value of $P_{nl}$ in dependence on at least one of the number of optical communication signals, a characteristic of the optical fibre and a modulation format of the optical communication signals.

12. The optical communication network element as claimed in claim 10, wherein the controller is configured in step b. to obtain a value for the saturated gain, G, of the Raman amplifier at the selected optical pump signal power and the selected optical signal power, and is configured to calculate a nonlinear enhancement factor, NEF, for the selected optical signal power and to calculate an optimal optical signal power in the absence of Raman amplification, $P_{nl}$, as $P_{nl}=P_{ch}+NEF$.

13. The optical communication network element as claimed in claim 10, wherein the optical communication network element comprises a gain measurement apparatus configured to measure the saturated gain of the Raman amplifier and the controller is configured to receive the measured saturated gain and to calculate the nonlinear enhancement factor as NEF=M*G, where M is in a range 0.7-0.8.

14. The optical communication network element as claimed in claim 10, wherein the controller is configured to calculate saturated gain (G(z)) as $$G(z) = \frac{G_0(z)(P_p + S)}{P_p + G_0(z)S}$$

where z is a distance along the optical link, S is a normalised total optical signal power, $P_p$ is a normalised optical pump signal power, and $G_0(z)$ is an unsaturated gain of the Raman amplifier.

15. The optical communication network element as claimed in claim 14, wherein $G_0(z)$ is given by $G_0(z)=\exp((P_p+S)(1-e^{-\alpha z}))$, where $\alpha$ is a loss coefficient of the optical link at a wavelength of the optical communication signal, and wherein the controller is configured to calculate the nonlinear enhancement factor as a ratio of effective lengths of the Raman amplifier with and without Raman amplification and wherein the normalised optical pump signal power is given by $$P_p = \frac{f_s g_R P_p(0)}{f_p \alpha_p A_{eff}}$$

where $f_s$ is an optical communication signal frequency, $f_p$ is an optical pump signal frequency, $g_R$ is a Raman gain of the optical fibre, $P_p(0)$ is a normalised pump signal power at z=0, $\alpha_p$ is a loss coefficient of the optical fibre at the optical pump signal frequency, and $A_{eff}$ is an effective area of the fibre, and the normalised total optical signal power is given by $$S = \frac{g_R P_s(0)}{\alpha_s A_{eff}}$$

where $P_s(0)$ is an optical signal power at z=0, and $\alpha_s$ is a loss coefficient of the fibre at the optical communication signal frequency.

16. The optical communication network element as claimed in claim 14, wherein the controller is configured to calculate the nonlinear enhancement factor as $$NEF = \frac{1}{S}\ln\left(\frac{G_0(z)}{G(z)}\right).$$

17. An optical communication network comprising:
an optical link comprising an optical fibre configured as a Raman amplifier configured for co-propagating Raman amplification; and
an optical communication network element comprising:
an optical pump signal source;
an optical communication signal power control apparatus;
an output configured to output at least one optical communication signal and a co-propagating optical pump signal to be delivered to an optical link comprising a Raman amplifier; and
a controller configured to:
  a. select an optical pump signal power ($P_p$) such that a saturated gain (G) of the Raman amplifier is maximised without exceeding a gain threshold above which an optical signal to noise ratio penalty caused by double Rayleigh scattering is no longer negligible in the Raman amplifier;
  b. select an optical signal power ($P_{ch}$) for the at least one optical communication signal, the optical signal power being selected to maximise a Q-factor of the optical signal for said maximised saturated gain of the Raman amplifier;
  c. generate a pump power control signal configured to cause the optical pump signal source of the Raman amplifier to generate an optical pump signal having the selected optical pump signal power; and
  d. generate a signal power control signal configured to cause the optical communication signal power control apparatus to set the optical signal power of the at least one optical communication signal to the selected optical signal power.

18. A non-transitory machine-readable storage medium having computer code stored therein, which when executed by a set of one or more processors of a network element of an optical communication network comprising an optical link comprising an optical fibre configured as a Raman amplifier configured for co-propagating Raman amplification, causes the network element to perform operations comprising:
  a. selecting an optical pump signal power ($P_p$) of the Raman amplifier such that a saturated gain (G) of the Raman amplifier is at a maximum operating level without exceeding a gain threshold above which an optical signal to noise ratio penalty caused by double Rayleigh scattering is no longer negligible in the Raman amplifier:
  b. selecting an optical signal power ($P_{ch}$) for at least one optical communication signal to be transmitted across the optical link, the optical signal power being selected to maximise a Q-factor of the optical signal when the Raman amplifier is configured for said maximum operating level of the saturate gain;
  c. generating a pump signal power control signal configured to cause an optical pump signal source of the Raman amplifier to generate an optical pump signal having the selected optical pump signal power; and
  d. generating a signal power control signal configured to cause the optical communication signal to be delivered into the optical link at the selected optical signal power.

\* \* \* \* \*